(12) United States Patent
Watanabe et al.

(10) Patent No.: US 12,249,871 B2
(45) Date of Patent: Mar. 11, 2025

(54) ROTOR, MOTOR, BLOWER, AIR CONDITIONER, AND MANUFACTURING METHOD OF ROTOR

(71) Applicant: Mitsubishi Electric Corporation, Tokyo (JP)

(72) Inventors: Takanori Watanabe, Tokyo (JP); Hiroki Aso, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 312 days.

(21) Appl. No.: 17/796,424

(22) PCT Filed: Mar. 27, 2020

(86) PCT No.: PCT/JP2020/014062
§ 371 (c)(1),
(2) Date: Jul. 29, 2022

(87) PCT Pub. No.: WO2021/192236
PCT Pub. Date: Sep. 30, 2021

(65) Prior Publication Data
US 2023/0163648 A1 May 25, 2023

(51) Int. Cl.
*H02K 1/278* (2022.01)
*H02K 15/03* (2006.01)
*F24F 13/00* (2006.01)

(52) U.S. Cl.
CPC ............ *H02K 1/278* (2013.01); *H02K 15/03* (2013.01); *F24F 13/00* (2013.01)

(58) Field of Classification Search
CPC .......... H02K 1/278; H02K 15/03; H02K 1/22; H02K 1/02
USPC ................................................ 310/43, 156.55
See application file for complete search history.

(56) References Cited

FOREIGN PATENT DOCUMENTS

| | | |
|---|---|---|
| EP | 3902114 A1 | 10/2021 |
| GB | 2575300 A | 1/2020 |
| JP | H08-340651 A | 12/1996 |
| JP | H09-093842 A | 4/1997 |
| JP | 2005151757 A * | 6/2005 |
| JP | 2011-087393 A | 4/2011 |
| JP | 2016-219607 A | 12/2016 |
| WO | 2018/0016067 A1 | 1/2018 |
| WO | WO-2020129123 A1 * | 6/2020 ........... H01F 41/028 |

OTHER PUBLICATIONS

Search Report issued on Apr. 21, 2023 in connection with counterpart European Patent Application No. 20927824.1.
Office Action issued on Mar. 24, 2023 in connection with counterpart Australian Patent Application No. 2020437705.
(Continued)

*Primary Examiner* — Jose A Gonzalez Quinones
(74) *Attorney, Agent, or Firm* — Posz Law Group, PLC

(57) ABSTRACT

A rotor includes a rotary shaft and a rotor body supported by the rotary shaft. The rotor body includes a first permanent magnet and a second permanent magnet. The first permanent magnet has a first overhang part that is in contact with a first end part of the second permanent magnet in an axial direction of the rotary shaft, and the first overhang part and the first end part are joined to each other. A motor includes the rotor and a stator.

25 Claims, 25 Drawing Sheets

(56) References Cited

OTHER PUBLICATIONS

International Search Report of the International Searching Authority mailed Jun. 23, 2020 for the corresponding International application No. PCT/JP2020/014062 (and English translation).
Office Action issued on Dec. 22, 2022 in connection with counterpart Indian Patent Application No. 202227051633 (and English translation).

* cited by examiner

COMPARATIVE EXAMPLE

ROTOR, MOTOR, BLOWER, AIR CONDITIONER, AND MANUFACTURING METHOD OF ROTOR

CROSS REFERENCE TO RELATED APPLICATION

This application is a U.S. national stage application of International Patent Application No. PCT/JP2020/014062 filed on Mar. 27, 2020, the disclosure of which is incorporated herein by reference.

TECHNICAL FIELD

The present disclosure relates to a rotor, a motor, a blower, an air conditioner, and a manufacturing method of the rotor.

BACKGROUND

As a rotor used for a motor, there has been proposed a rotor including a first permanent magnet and a second permanent magnet arranged on an inner side of the first permanent magnet and fixed to the first permanent magnet (see Patent References 1 and 2, for example).

PATENT REFERENCE

Patent Reference 1: Japanese Patent Application Publication No. 2011-87393
Patent Reference 2: Japanese Patent Application Publication No. 2005-151757

However, in the rotors described in the Patent References 1 and 2, there is a possibility that the first permanent magnet falls off of the second permanent magnet arranged on the inner side, when centrifugal force acts on the rotor during rotation, when a temperature change occurs, or the like.

SUMMARY

An object of the present disclosure is to prevent the falling off of the permanent magnet.

A rotor according to an aspect of the present disclosure includes a rotary shaft and a rotor body supported by the rotary shaft. The rotor body has a first permanent magnet and a second permanent magnet. The second permanent magnet is supported by the rotary shaft. The first permanent magnet has a plurality of pillar parts arranged at intervals in a circumferential direction of the rotor body and a first overhang part that is in contact with a first end part of the second permanent magnet in an axial direction of the rotary shaft. The first permanent magnet is supported by the second permanent magnet on an outer side of the second permanent magnet. The first overhang part and the first end part are joined to each other.

According to the present disclosure, the falling off of the permanent magnet can be prevented.

DETAILED DESCRIPTION

Figure 1:
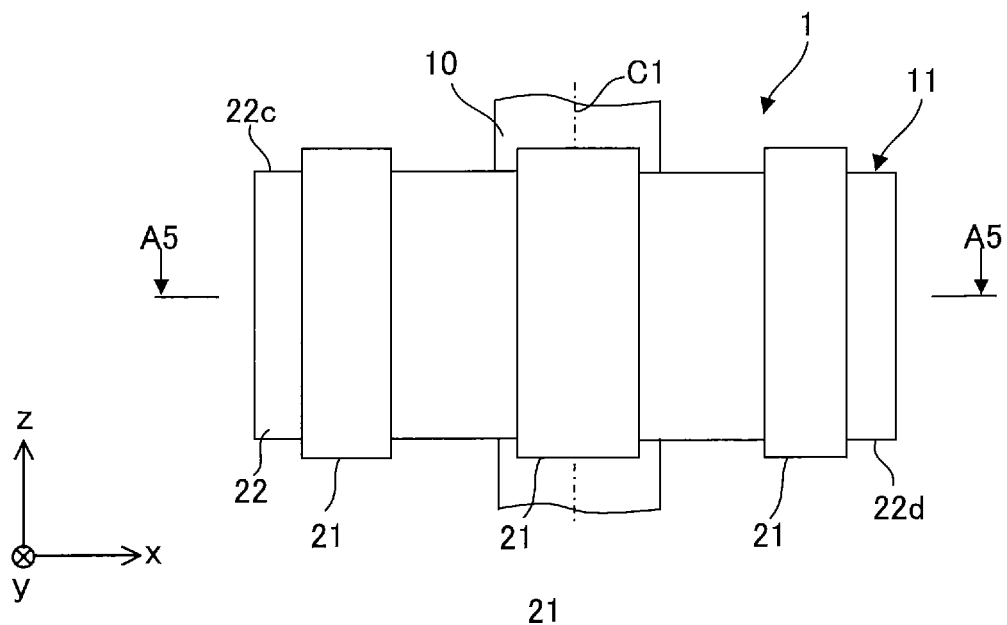
FIG. 1 is a side view showing the configuration of a rotor according to a first embodiment.

A rotor, a motor, a blower, an air conditioner, and a manufacturing method of a rotor according to each embodiment of the present disclosure will be described below with reference to the drawings. The following embodiments are just examples and it is possible to appropriately combine the embodiments and appropriately modify each embodiment.

An xyz orthogonal coordinate system is shown in the drawings to facilitate the understanding of the description. A z-axis is a coordinate axis parallel to an axis of a rotor. An x-axis is a coordinate axis orthogonal to the z-axis. A y-axis is a coordinate axis orthogonal to both the x-axis and the z-axis.

First Embodiment

Figure 2:
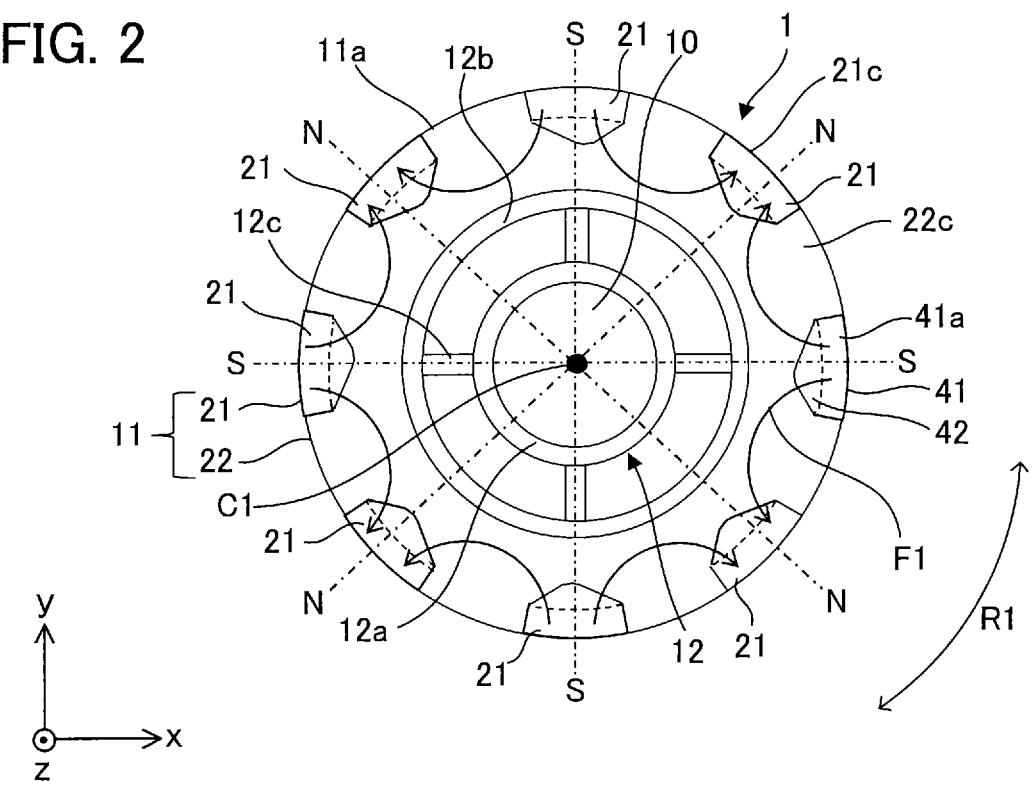
FIG. 2 is a plan view showing the configuration of the rotor according to the first embodiment.
Figure 3:
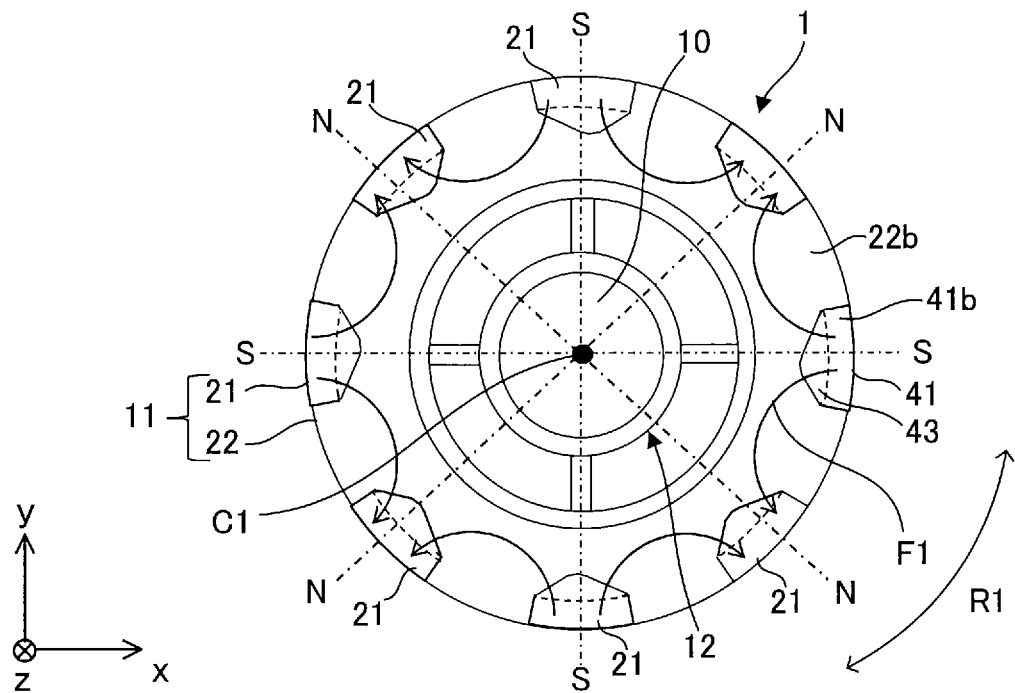
FIG. 3 is a bottom view showing the configuration of the rotor according to the first embodiment.

FIG. 1 is a side view showing the configuration of a rotor 1 according to a first embodiment. FIG. 2 is a plan view showing the configuration of the rotor 1 according to the first embodiment. FIG. 3 is a bottom view showing the configuration of the rotor 1 according to the first embodiment. As shown in FIGS. 1 to 3, the rotor 1 includes a shaft 10 as a rotary shaft, a rotor body 11 supported by the shaft 10, and a connection part 12 that connects the shaft 10 and the rotor body 11 to each other. The rotor 1 is rotatable about an axis C1 of the shaft 10. The shaft 10 extends in the z-axis direction. In the following description, a direction along a circumference of a circle about the axis C1 of the shaft 10 is referred to as a "circumferential direction", the z-axis direction is referred to as an "axial direction", and a direction orthogonal to the axial direction is referred to as a "radial direction".

The rotor body 11 includes a plurality of rare-earth bond magnets 21 as first permanent magnets and a ferrite bond magnet 22 as a second permanent magnet. Namely, two permanent magnets (hereinafter referred to also as "bond magnets") included in the rotor body 11 are of types different from each other. Specifically, the two permanent magnets included in the rotor body 11 differ from each other in magnetic pole strength (i.e., quantity of magnetism). In the first embodiment, the magnetic pole strength of the rare-earth bond magnet 21 is greater than the magnetic pole strength of the ferrite bond magnet 22. Further, in the first embodiment, the two bond magnets included in the rotor body 11 differ from each other in the linear expansion coefficient.

The rare-earth bond magnet 21 includes a rare-earth magnet and a resin. The rare-earth magnet is a neodymium magnet including neodymium (Nd), iron (Fe) and boron (B), a samarium iron nitrogen magnet including samarium (Sm), iron (Fe) and nitrogen (N), or the like, for example. The resin included in the rare-earth bond magnet is nylon resin, PPS (Poly Phenylene Sulfide) resin, epoxy resin or the like, for example.

The ferrite bond magnet 22 includes a ferrite magnet and a resin. The resin included in the ferrite bond magnet 22 is nylon resin, PPS resin, epoxy resin or the like, similarly to the resin included in the rare-earth bond magnet.

Figure 4:
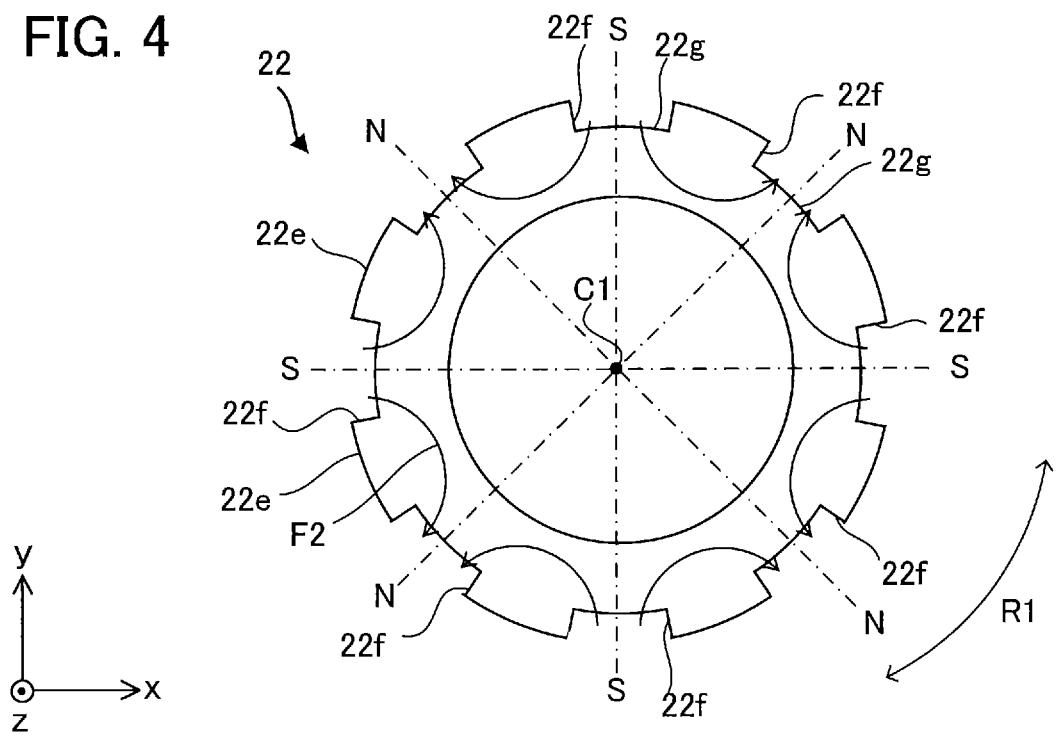
FIG. 4 is a plan view showing the configuration of a second permanent magnet according to the first embodiment.

FIG. 4 is a plan view showing the configuration of the ferrite bond magnet 22. As shown in FIG. 4, the shape of the ferrite bond magnet 22 in a plane parallel to the xy plane is a ring shape about the axis C1. Outer peripheral surfaces 22e of the ferrite bond magnet 22 form parts of an outer peripheral surface 11a (see FIG. 2) of the rotor body 11. The ferrite bond magnet 22 includes a plurality of (eight in FIG. 4) groove parts 22f famed between a plurality of outer peripheral surfaces 22e adjoining in the circumferential direction R1. The plurality of groove parts 22f are arranged at intervals in the circumferential direction R1 about the axis C1. Each groove part 22f is an elongated groove which is elongated in the axial direction.

The ferrite bond magnet 22 is oriented to have polar anisotropy. Bottom surfaces 22g of a plurality of groove parts 22f adjoining each other in the circumferential direction R1 have magnetic poles different from each other in the polarity. The arc-shaped arrow F2 shown in FIG. 4 indicates the direction of magnetic flux in the ferrite bond magnet 22. Magnetic flux flowing in from the outer side of a south pole groove part 22f in the radial direction advances to a north pole groove part 22f adjoining in the circumferential direction. Thus, the rotor 1 does not need a rotor core that forms a magnetic path on the inner side of the ferrite bond magnet 22 in the radial direction. Accordingly, the number of components in the rotor 1 can be reduced and the weight of the rotor 1 can be reduced.

As shown in FIGS. 1 to 3, the ferrite bond magnet 22 is supported by the shaft 10 via the connection part 12. The connection part 12 is formed of an unsaturated polyester resin, for example. The connection part 12 includes an inner cylinder part 12a, an outer cylinder part 12b and a plurality of (four in the first embodiment) ribs 12c. The inner cylinder part 12a is in a cylindrical shape and fixed to an outer circumferential surface of the shaft 10. The outer cylinder part 12b is in a cylindrical shape and fixed to an inner circumferential surface of the ferrite bond magnet 22. The plurality of ribs 12c connect the inner cylinder part 12a and the outer cylinder part 12b to each other. The plurality of ribs 12c radially extend outward in the radial direction from the inner cylinder part 12a. The plurality of ribs 12c are arranged at equal angles in the circumferential direction R1 about the axis C1. Incidentally, the ferrite bond magnet 22 may also be fixed to the shaft 10 directly via no connection part 12.

A plurality of (eight in the first embodiment) rare-earth bond magnets 21 are supported by the ferrite bond magnet 22. The plurality of rare-earth bond magnets 21 are arranged at intervals in the circumferential direction R1. An outer peripheral surface 21c of each of the plurality of rare-earth bond magnets 21 forms a part of the outer peripheral surface 11a of the rotor body 11.

Each of the plurality of rare-earth bond magnets 21 is oriented to have the polar anisotropy. A plurality of rare-earth bond magnets 21 adjoining each other in the circumferential direction R1 have magnetic poles different from each other in the polarity. The arc-shaped arrow F1 shown in FIGS. 2 and 3 indicates the direction of magnetic flux in the rare-earth bond magnet 21. Magnetic flux flowing in from the outer side of a south pole rare-earth bond magnet 21 in the radial direction advances to a north pole rare-earth bond magnet 21 adjoining in the circumferential direction R1. In the first embodiment, the rotor body 11 includes eight magnetic poles. Incidentally, the number of poles of the rotor body 11 is not limited to 8. It is sufficient that the number is 2n or more. The number n is a natural number greater than or equal to 1.

Figure 5:
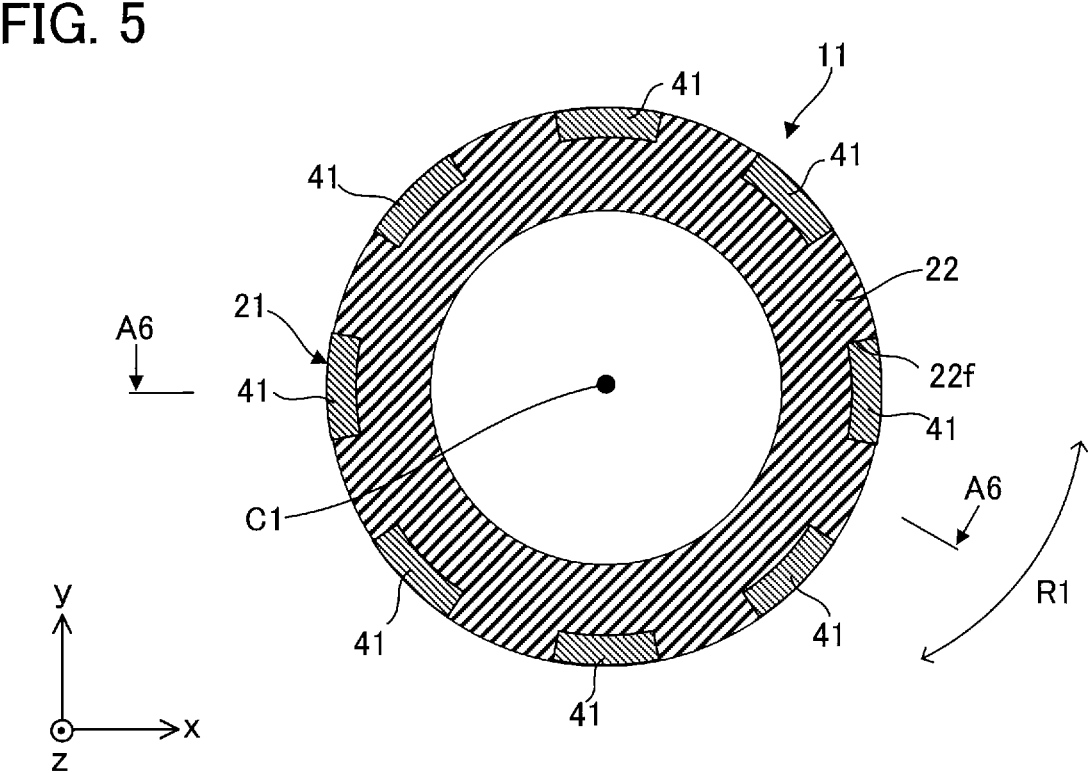
FIG. 5 is a sectional view of the rotor shown in FIG. 1 taken along the line A5-A5.
Figure 6:
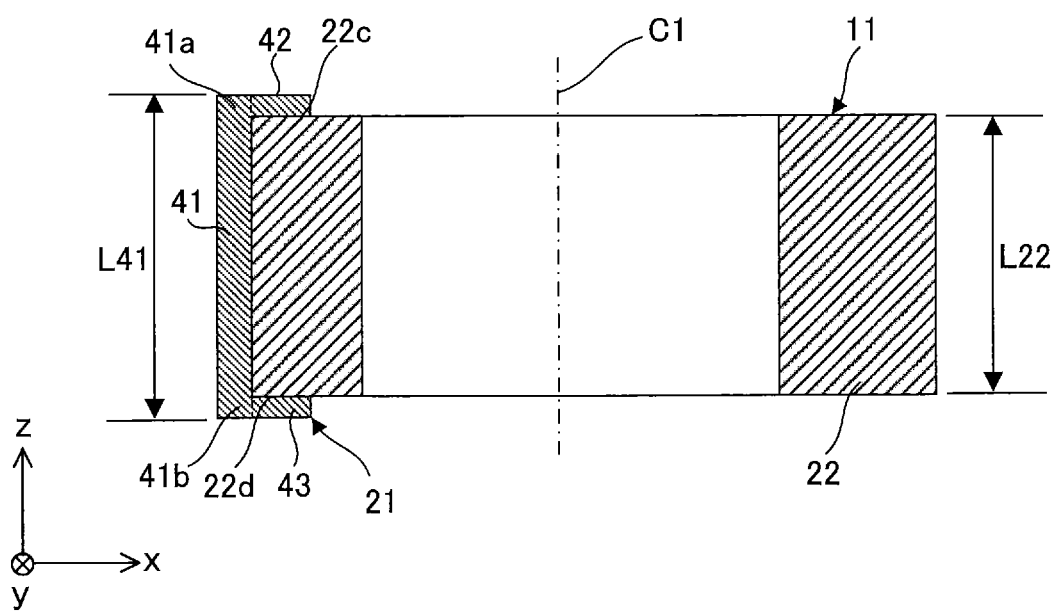
FIG. 6 is a sectional view of the rotor shown in FIG. 5 taken along the line A6-A6.

FIG. 5 is a sectional view of the rotor 1 shown in FIG. 1 taken along the line A5-A5. FIG. 6 is a sectional view of the rotor body 11 shown in FIG. 5 taken along the line A6-A6. Incidentally, the shaft 10 and the connection part 12 are not shown in FIG. 5. As shown in FIGS. 5 and 6, the rare-earth bond magnet 21 includes a pillar part 41, a first overhang part 42 and a second overhang part 43.

The pillar part 41 is arranged in the groove part 22f (see FIG. 4) of the ferrite bond magnet 22. The pillar part 41 is arranged on the outer side in the radial direction relative to the bottom surface 22g of the groove part 22f. The pillar part 41 extends in the axial direction. The length L41 of the pillar part 41 in the axial direction is greater than the length L22 of the ferrite bond magnet 22 in the axial direction. The shape of the pillar part 41 as viewed in the −z-axis direction is a fan-like shape, for example. In an xy plane, an inner peripheral surface and an outer peripheral surface of the pillar part 41 are formed in the form of concentric circles. Namely, the thickness of the pillar part 41 in the xy plane is constant in the circumferential direction R1.

The first overhang part 42 extends inward in the radial direction from an end part 41a of the pillar part 41 on the +z-axis side. In other words, the pillar part 41 is situated on the outer side in the radial direction relative to the first overhang part 42. The first overhang part 42 is in contact with an end part 22c of the ferrite bond magnet 22 on the +z-axis side as a first end part. In FIG. 2, the width of the first overhang part 42 in the circumferential direction R1 decreases toward the inner side in the radial direction. The shape of the first overhang part 42 as viewed in the −z-axis direction is a substantially triangular shape, for example.

The second overhang part 43 extends inward in the radial direction from an end part 41b of the pillar part 41 on the −z-axis side. The second overhang part 43 is in contact with an end part 22d of the ferrite bond magnet 22 on the −z-axis side as a second end part. The width of the second overhang part 43 in the circumferential direction R1 decreases toward the inner side in the radial direction. The shape of the second overhang part 43 as viewed in the −z-axis direction is a substantially triangular shape, for example, similarly to the first overhang part 42. Incidentally, the shape of the first overhang part 42 and the shape of the second overhang part 43 as viewed in the −z-axis direction are not limited to the substantially triangular shape but may also be different shapes. Further, the rare-earth bond magnet 21 may also be configured to include only one of the first overhang part 42 and the second overhang part 43.

In the first embodiment, the pillar parts 41 and the groove parts 22f are joined to each other by integral molding (referred to also as "two-color molding") of the rare-earth bond magnets 21 and the ferrite bond magnet 22. In the first embodiment, the integral molding of the rare-earth bond magnets 21 and the ferrite bond magnet 22 means integrating the rare-earth bond magnets 21 and the ferrite bond magnet 22 together by molding the rare-earth bond magnets 21 in a state where the ferrite bond magnet 22 manufactured previously is arranged in a mold.

Further, in the first embodiment, the first overhang part 42 and the end part 22c of the ferrite bond magnet 22 on the +z-axis side are joined to each other and the second overhang part 43 and the end part 22d of the ferrite bond magnet 22 on the −z-axis side are joined to each other. Since the rare-earth bond magnet 21 and the ferrite bond magnet 22 are joined to each other in the axial direction in the first embodiment as described above, a joining area between the rare-earth bond magnet 21 and the ferrite bond magnet 22 can be increased. Accordingly, the falling off of the rare-earth bond magnet 21 from the ferrite bond magnet 22 can be prevented even when peeling occurs at the interface between the ferrite bond magnet 22 and the rare-earth bond magnet 21 due to expansion or contraction caused by a temperature change or centrifugal force acting on the rotor.

Figure 7:
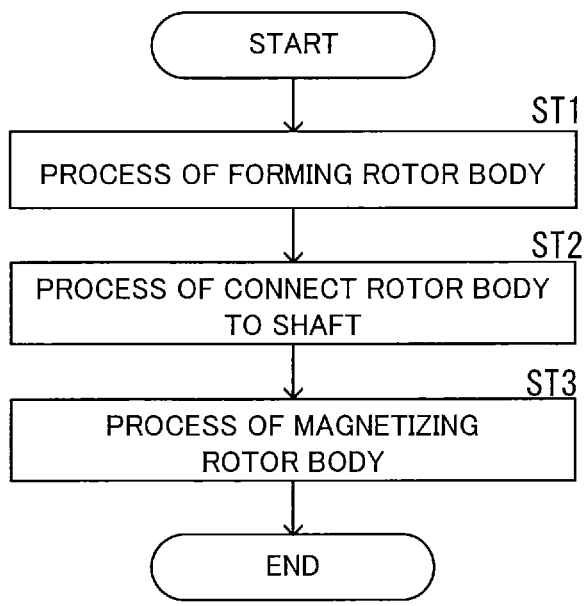
FIG. 7 is a flowchart showing a manufacturing process of the rotor according to the first embodiment.

Next, a manufacturing method of the rotor 1 will be described below by using FIG. 7. FIG. 7 is a flowchart showing a manufacturing process of the rotor 1.

In step ST1, the rotor body 11 is formed. Incidentally, details of the step ST1 will be described later.

In step ST2, the rotor body 11 is connected to the shaft 10. In the first embodiment, the rotor body 11 is connected to the shaft 10 by integrating the rotor body 11 and the shaft 10 with each other via the connection part 12.

In step ST3, the rotor body 11 is magnetized by using a magnetizer, for example. Specifically, the rare-earth bond magnets 21 and the ferrite bond magnet 22 are magnetized so that the rare-earth bond magnets 21 and the ferrite bond magnet 22 have the polar anisotropy.

Figure 8:
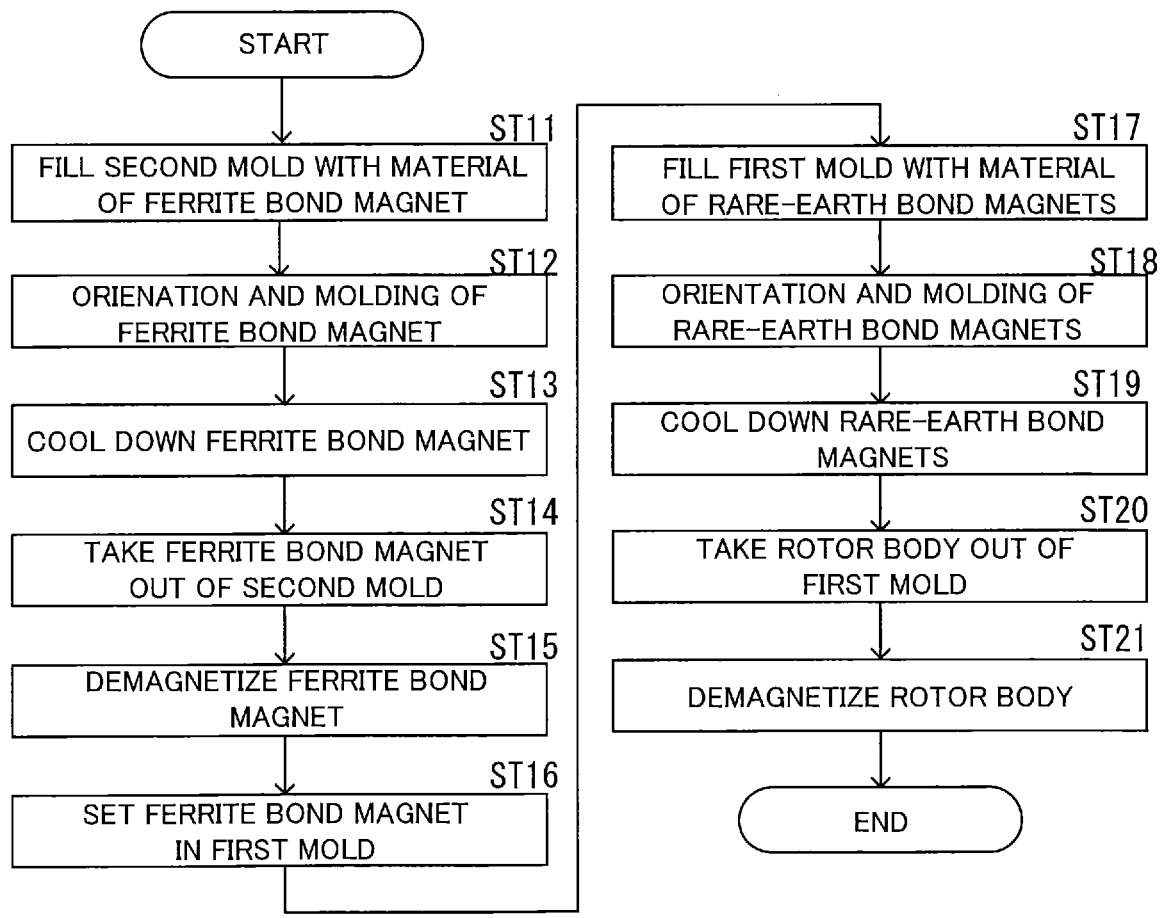
FIG. 8 is a flowchart showing details of a process of forming a rotor body according to the first embodiment.

Next, details of the process of forming the rotor body 11 will be described below by using FIG. 8. FIG. 8 is a flowchart showing the details of the process of foaming the rotor body 11. The process of foaming the rotor body 11 uses a second mold for molding the ferrite bond magnet 22, a first mold for molding the rare-earth bond magnets 21 supported by the ferrite bond magnet 22, and a magnet for the orientation.

In step ST11, the inside of the second mold for molding the ferrite bond magnet 22 is filled in with the material of the ferrite bond magnet 22. The ferrite bond magnet 22 is molded by injection molding, for example. Incidentally, the method of molding the ferrite bond magnet 22 is not limited to the injection molding. The ferrite bond magnet 22 may be molded by a different molding method such as press molding.

In step ST12, the ferrite bond magnet 22 having a predetermined shape is molded while the material of the ferrite bond magnet 22 is oriented. In the step ST12, the ferrite bond magnet 22 is molded while the material of the ferrite bond magnet 22 is oriented in a state where a magnetic field having polar anisotropy is generated inside the second mold by using the magnet for the orientation, for example. By this step, the ferrite bond magnet 22 having the polar anisotropy is molded.

In step ST13, the molded ferrite bond magnet 22 is cooled down.

In step ST14, the ferrite bond magnet 22 is taken out of the second mold.

In step ST15, the ferrite bond magnet 22 taken out is demagnetized.

In step ST16, the ferrite bond magnet 22 is arranged in the first mold for injection molding of the rare-earth bond magnets 21.

In step ST17, the plurality of groove parts 22f of the ferrite bond magnet 22 arranged in the first mold are filled in with the material of the rare-earth bond magnets 21. The rare-earth bond magnets 21 are molded by injection molding, for example. Incidentally, the method of molding the rare-earth bond magnets 21 is not limited to the injection molding. The rare-earth bond magnets 21 may be molded by a different molding method such as press molding.

In step ST18, each rare-earth bond magnet 21 having a predetermined shape is molded while the material of the rare-earth bond magnet 21 is oriented. In the step ST18, each rare-earth bond magnet 21 is molded while the material of the rare-earth bond magnet 21 is oriented in a state where a magnetic field having polar anisotropy is generated inside the first mold by using the magnet for the orientation, for example. By this step, the plurality of rare-earth bond magnets 21 having the polar anisotropy are molded. Namely, the rotor body 11 including the rare-earth bond magnets 21 and the ferrite bond magnet 22 integrally molded together is formed. When the rare-earth bond magnets 21 and the ferrite bond magnet 22 are integrally molded together, two bond magnets of types different from each other are fused to each other. By this process, the first overhang part 42 of the rare-earth bond magnet 21 is fixed to the end part 22c of the ferrite bond magnet 22 on the +z-axis side, and the second overhang part 43 of the rare-earth bond magnet 21 is fixed to the end part 22d of the ferrite bond magnet 22 on the −z-axis side.

In step ST19, the foamed rotor body 11 is cooled down.

In step ST20, the rotor body 11 is taken out of the first mold.

In step ST21, the rotor body 11 taken out is demagnetized.

Figure 9:
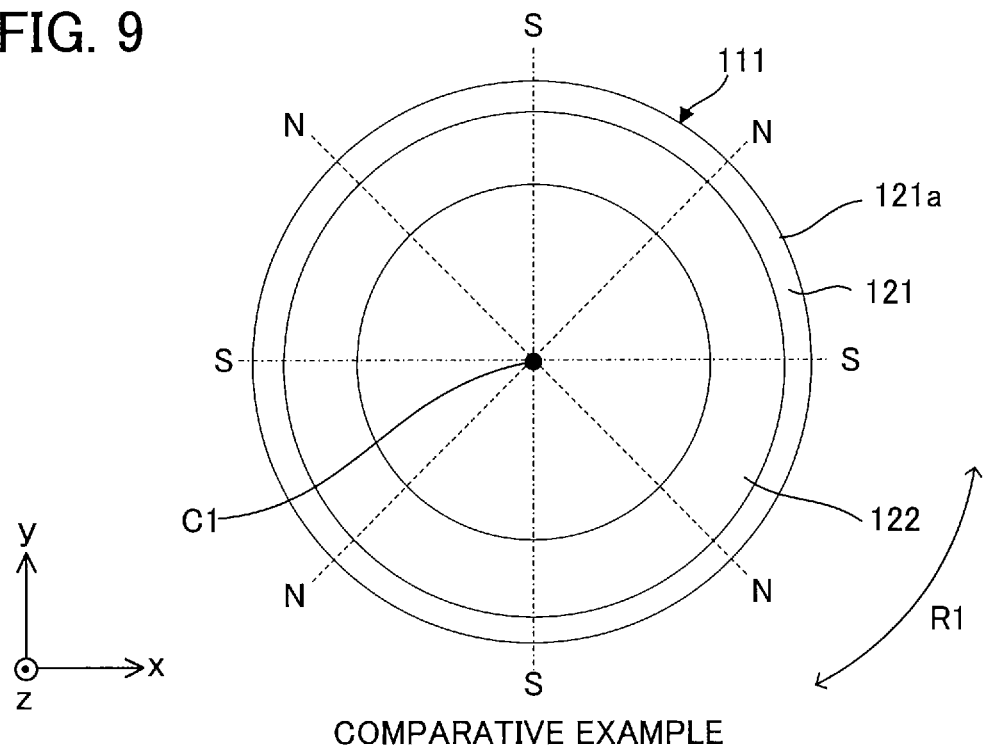
FIG. 9 is a plan view showing the configuration of a rotor body according to a comparative example.

Next, the manufacturing cost of the rotor body 11 according to the first embodiment will be described below while making a comparison with a rotor body 111 according to a comparative example. FIG. 9 is a plan view showing the configuration of the rotor body 111 according to the comparative example. As shown in FIG. 9, in the rotor body 111 according to the comparative example, a rare-earth bond magnet 121 in a ring shape is arranged on the outer side of a ferrite bond magnet 122 in a ring shape. Namely, in the rotor body 111 according to the comparative example, the whole of an outer peripheral surface of the rotor body 111 is famed by an outer peripheral surface 121a of the rare-earth bond magnet 121.

In contrast, in the first embodiment, the outer peripheral surface 11a of the rotor body 11 is formed by the outer peripheral surfaces 22e of the ferrite bond magnet 22 and the outer peripheral surfaces 21c of the rare-earth bond magnets 21. With this configuration, in the rotor body 11 according to the first embodiment, the amount of the rare-earth bond magnet 21 can be reduced as compared to the rotor body 111 according to the comparative example. In the rotor 1 according to the first embodiment, the amount of the rare-earth bond magnet 21 can be reduced by approximately 20% as compared to the rotor according to the comparative example. The rare-earth bond magnet 21 is expensive as compared to the ferrite bond magnet 22. For example, the material unit price of the rare-earth bond magnet is ten times or more of the material unit price of the ferrite bond magnet. Thus, the manufacturing cost of the rotor body 11 according to the first embodiment can be reduced.

Figure 10:
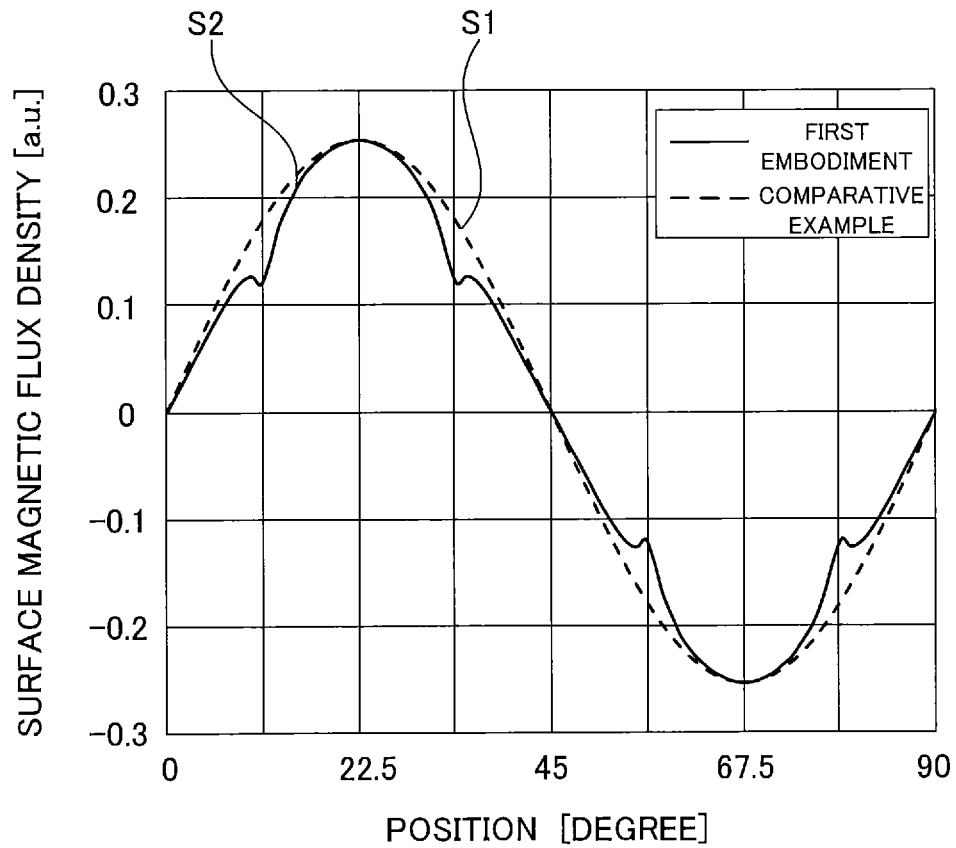
FIG. 10 is a graph showing a distribution of surface magnetic flux density of the rotor body according to the first embodiment and a distribution of surface magnetic flux density of the rotor body according to the comparative example.

Next, surface magnetic flux density of the rotor body 11 according to the first embodiment will be described below while making a comparison with the rotor body 111 according to the comparative example. FIG. 10 is a graph showing a distribution of the surface magnetic flux density of the rotor body 11 according to the first embodiment and a distribution of the surface magnetic flux density of the rotor body 111 according to the comparative example. In FIG. 10, the horizontal axis represents the position [degree] in the circumferential direction R1 on the outer peripheral surface of the rotor body 11 or the outer peripheral surface of the rotor body 111, and the vertical axis represents the surface magnetic flux density [a.u.]. Further, in FIG. 10, the solid line indicates the distribution of the surface magnetic flux density of the rotor body 11 according to the first embodiment, and the broken line indicates the distribution of the surface magnetic flux density of the rotor body 111 according to the comparative example.

As shown in FIG. 10, the distribution of the surface magnetic flux density of the rotor body 111 according to the comparative example is represented by a waveform S1 of an even sinusoidal wave. Meanwhile, the distribution of the surface magnetic flux density of the rotor body 11 according to the first embodiment is represented by a waveform S2 of a substantially sinusoidal wave being approximately even. Namely, as compared to the rotor body 111 according to the comparative example, an abrupt change in the surface magnetic flux density in the circumferential direction R1 is inhibited also in the rotor body 11 according to the first embodiment. Specifically, while magnetic flux density equivalent to that in the rotor body 111 according to the comparative example is obtained in a magnetic pole center (a north pole or a south pole) of the rotor body 11 according to the first embodiment, magnetic flux density slightly less than that in the rotor body 111 according to the comparative example is obtained in an inter-pole part (between a north pole and a south pole). However, the decrease in the magnetic flux density can be compensated for since the rotor body 11 according to the first embodiment includes the plurality of rare-earth bond magnets 21 even if the amount of the ferrite bond magnet 22 is smaller as compared to the rotor body 111 according to the comparative example. Accordingly, the rotor body 11 according to the first embodiment is capable of achieving inductive voltage equivalent to that of the rotor body 111 according to the comparative example.

As described above, with the rotor 1 according to the first embodiment, the first overhang part 42 of the rare-earth bond magnet 21 and the end part 22c of the ferrite bond magnet 22 on the +z-axis side are joined to each other. With this configuration, the joining area between the rare-earth bond magnet 21 and the ferrite bond magnet 22 increases, and thus the falling off of the rare-earth bond magnet 21 from the ferrite bond magnet 22 can be prevented.

Further, with the rotor 1 according to the first embodiment, the second overhang part 43 of the rare-earth bond magnet 21 and the end part 22d of the ferrite bond magnet 22 on the −z-axis side are joined to each other. With this configuration, the joining area between the rare-earth bond magnet 21 and the ferrite bond magnet 22 increases further, and thus the falling off of the rare-earth bond magnet 21 from the ferrite bond magnet 22 is further less likely to occur.

Furthermore, with the rotor 1 according to the first embodiment, the ferrite bond magnet 22 supported by the shaft 10 has the polar anisotropy. Accordingly, it is unnecessary to arrange the rotor core for foaming a magnetic path, on the inner side of the ferrite bond magnet 22 in the radial direction, and thus the number of components in the rotor 1 can be reduced and the weight of the rotor 1 can be reduced.

Moreover, with the rotor 1 according to the first embodiment, the outer peripheral surface of the rotor body 11 is formed by the outer peripheral surfaces 22e of the ferrite bond magnet 22 and the outer peripheral surfaces 21c of the rare-earth bond magnets 21. The rare-earth bond magnet 21 is more expensive than the ferrite bond magnet 22. In the rotor 1 according to the first embodiment, the amount of the rare-earth bond magnet 21 can be reduced, and thus the manufacturing cost of the rotor 1 can be reduced.

In addition, with the rotor 1 according to the first embodiment, the rotor 1 is capable of achieving inductive voltage equivalent to that of the rotor according to the comparative example since an abrupt change in the surface magnetic flux density of the rotor body 11 is inhibited even in the case where the amount of the rare-earth bond magnet 21 is reduced. Accordingly, the rotor 1 according to the first embodiment is capable of achieving high accuracy of rotation control equivalent to that of the rotor according to the comparative example.

Second Embodiment

Figure 11:
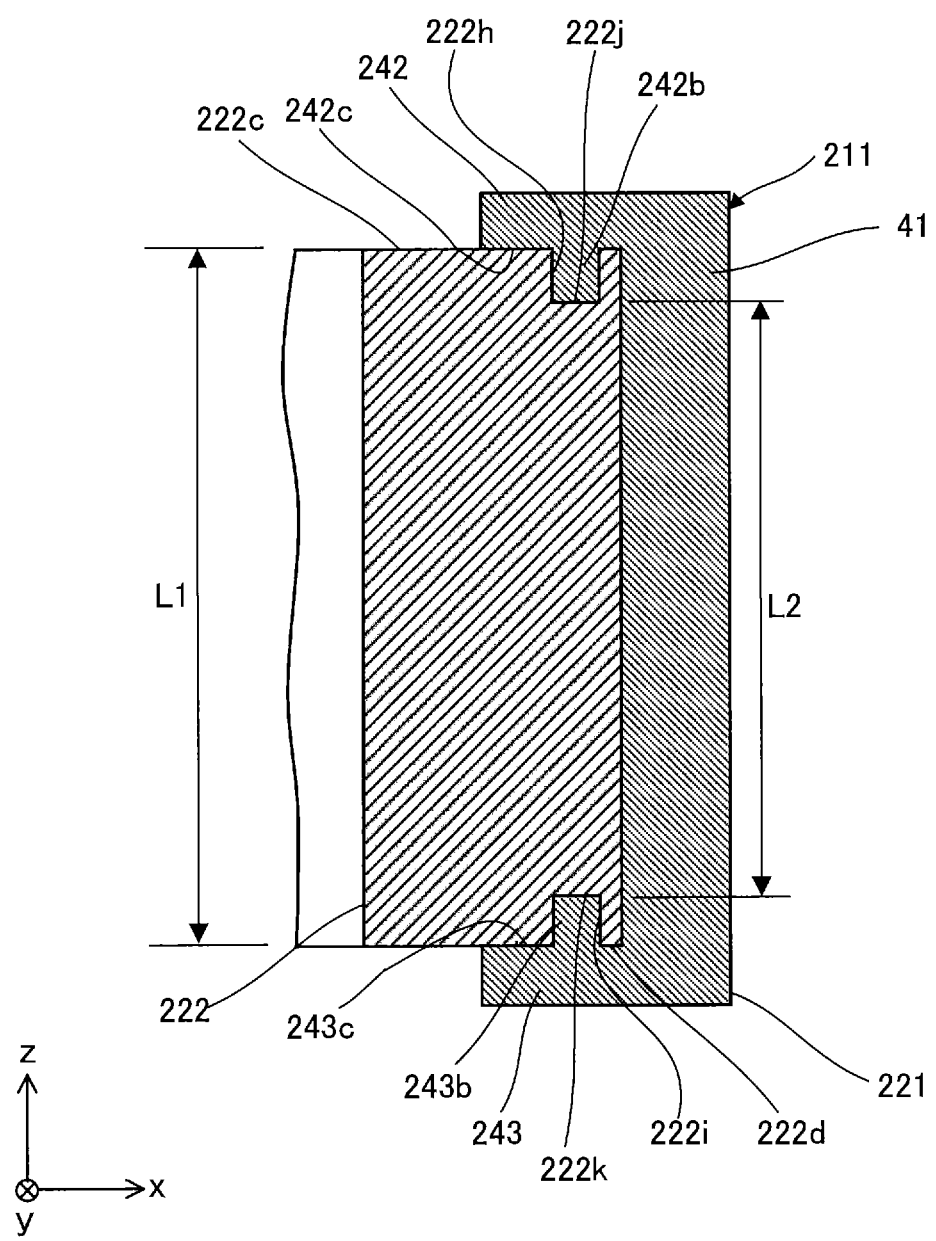
FIG. 11 is a partial sectional view showing the configuration of a rotor body according to a second embodiment.

FIG. 11 is a partial sectional view showing the configuration of a rotor body 211 of a rotor according to a second embodiment. In FIG. 11, components identical or corresponding to components shown in FIG. 6 are assigned the same reference characters as in FIG. 6. The rotor body 211 according to the second embodiment differs from the rotor body 11 according to the first embodiment in that an overhang part is fitted with a concave part formed on a ferrite bond magnet 222.

As shown in FIG. 11, the rotor body 211 includes a rare-earth bond magnet 221 and a ferrite bond magnet 222. The ferrite bond magnet 222 includes a first concave part 222h famed on an end part 222c on the +z-axis side and a second concave part 222i formed on an end part 222d on the −z-axis side. Incidentally, the ferrite bond magnet 222 may also be configured to include only one of the first concave part 222h and the second concave part 222i. Further, the ferrite bond magnet 222 may also be configured to include a plurality of first concave parts 222h or a plurality of second concave parts 222i.

The rare-earth bond magnet 221 includes the pillar part 41, a first overhang part 242 and a second overhang part 243. The first overhang part 242 includes a convex part 242b as a first fitting part. The convex part 242b projects toward the ferrite bond magnet 222 from an end face 242c of the first overhang part 242 on the −z-axis side. The convex part 242b is fitted in the first concave part 222h.

The second overhang part 243 includes a convex part 243b as a second fitting part. The convex part 243b projects toward the ferrite bond magnet 222 from an end face 243c of the second overhang part 243 on the +z-axis side. The convex part 243b is fitted in the second concave part 222i.

In the ferrite bond magnet 222, the length L1 in the axial direction between the end part 222c on the +z-axis side and the end part 222d on the −z-axis side is greater than the length L2 in the axial direction between a bottom surface 222j of the first concave part 222h and a bottom surface 222k of the second concave part 222i.

With the rotor according to the second embodiment described above, the convex part 242b of the first overhang part 242 is fitted in the first concave part 222h. With this configuration, the falling off of the rare-earth bond magnet 221 from the ferrite bond magnet 222 is further less likely to occur.

Further, with the rotor according to the second embodiment, the convex part 243b of the second overhang part 243 is fitted in the second concave part 222i. With this configuration, the falling off of the rare-earth bond magnet 221 from the ferrite bond magnet 222 is further less likely to occur.

Modification of Second Embodiment

Figure 12:
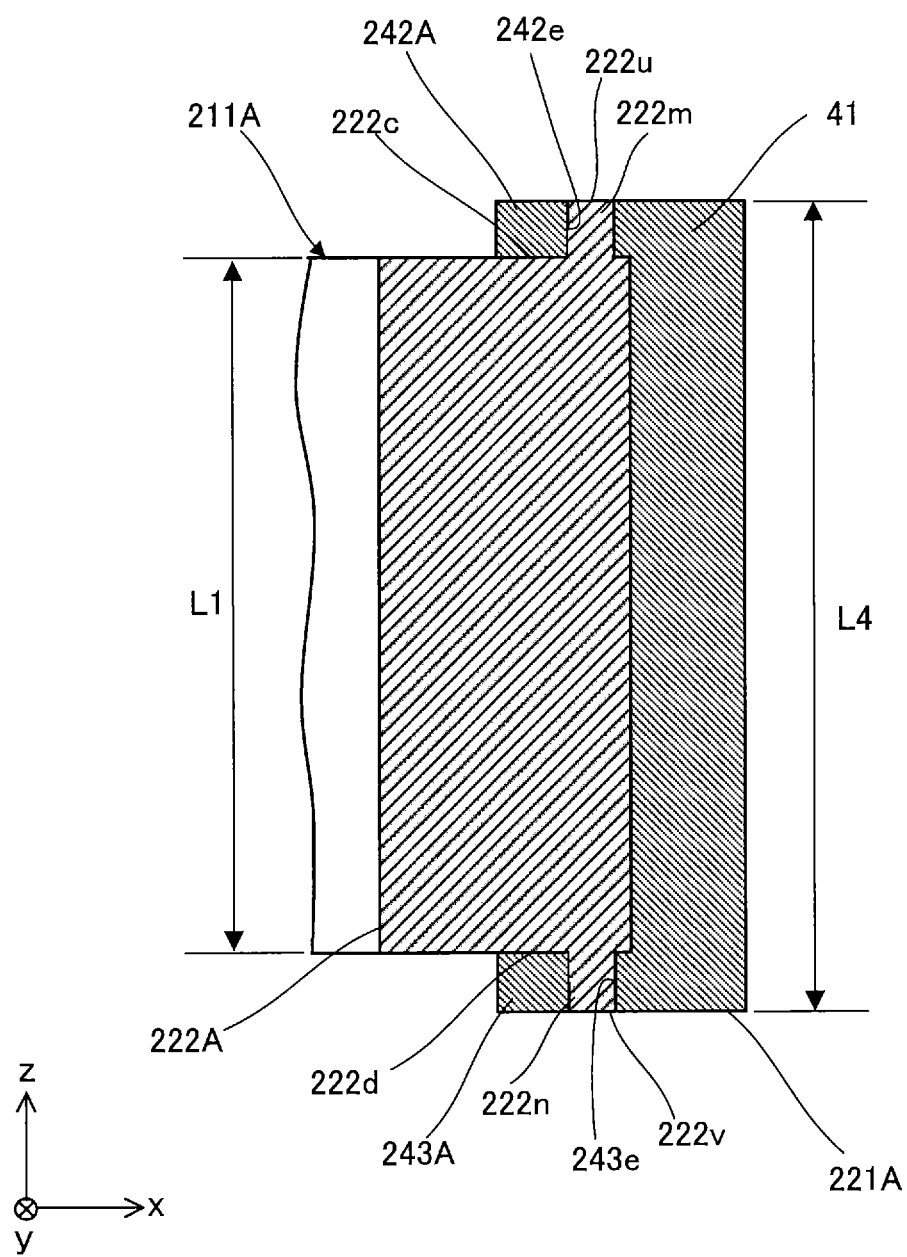
FIG. 12 is a partial sectional view showing the configuration of a rotor body according to a modification of the second embodiment.

FIG. 12 is a partial sectional view showing the configuration of a rotor body 211A of a rotor according to a modification of the second embodiment. In FIG. 12, components identical or corresponding to components shown in FIG. 11 are assigned the same reference characters as in FIG. 11. The rotor body 211A according to the modification of the second embodiment differs from the rotor body 11 according to the first embodiment in that an overhang part is fitted with a convex part formed on a ferrite bond magnet 222A.

As shown in FIG. 12, the rotor body 211A includes a rare-earth bond magnet 221A and a ferrite bond magnet 222A. The ferrite bond magnet 222A includes a first convex part 222m famed on the end part 222c on the +z-axis side and a second convex part 222n formed on the end part 222d on the −z-axis side. A surface 222u of the first convex part 222m on the +z-axis side is flush with a surface of the ferrite bond magnet 222A on the +z-axis side. A surface 222v of the second convex part 222n on the −z-axis side is flush with a surface of the ferrite bond magnet 222A on the −z-axis side. Incidentally, the ferrite bond magnet 222A may also be configured to include only one of the first convex part 222m and the second convex part 222n. Further, the ferrite bond magnet 222A may also be configured to include a plurality of first convex parts 222m or a plurality of second convex parts 222n.

The rare-earth bond magnet 221A includes the pillar part 41, a first overhang part 242A and a second overhang part 243A. The first overhang part 242A includes a through hole 242e as a first fitting part. The through hole 242e is fitted on the first convex part 222m. Incidentally, the first overhang part 242A may include not only the through hole 242e, but also a concave part fitted on the first convex part 222m.

The second overhang part 243A includes a through hole 243e as a second fitting part. The through hole 243e is fitted on the second convex part 222n. Incidentally, the second overhang part 243A may include not only the through hole 243e, but also a concave part fitted on the second convex part 222n.

In the ferrite bond magnet 222A, the length L1 in the axial direction between the end part 222c on the +z-axis side and the end part 222d on the −z-axis side is less than the length L3 in the axial direction between the surface 222u of the first convex part 222m on the +z-axis side and the surface 222v of the second convex part 222n on the −z-axis side.

With the rotor according to the modification of the second embodiment described above, the through hole 242e of the first overhang part 242A is fitted on the first convex part 221m of the ferrite bond magnet 222A. With this configuration, the falling off of the rare-earth bond magnet 221A from the ferrite bond magnet 222A is further less likely to occur.

Further, with the rotor according to the modification of the second embodiment, the through hole 243e of the second overhang part 243A is fitted on the second convex part 222n of the ferrite bond magnet 222A. With this configuration, the falling off of the rare-earth bond magnet 221A from the ferrite bond magnet 222A is further less likely to occur.

Furthermore, with the rotor according to the modification of the second embodiment, the first overhang part 242A and the second overhang part 243A include the through holes 242e and 243e. With this configuration, the amount of the rare-earth bond magnet 221A in the rotor body 211A is reduced, and thus the manufacturing cost of the rotor can be reduced.

Third Embodiment

Figure 13:
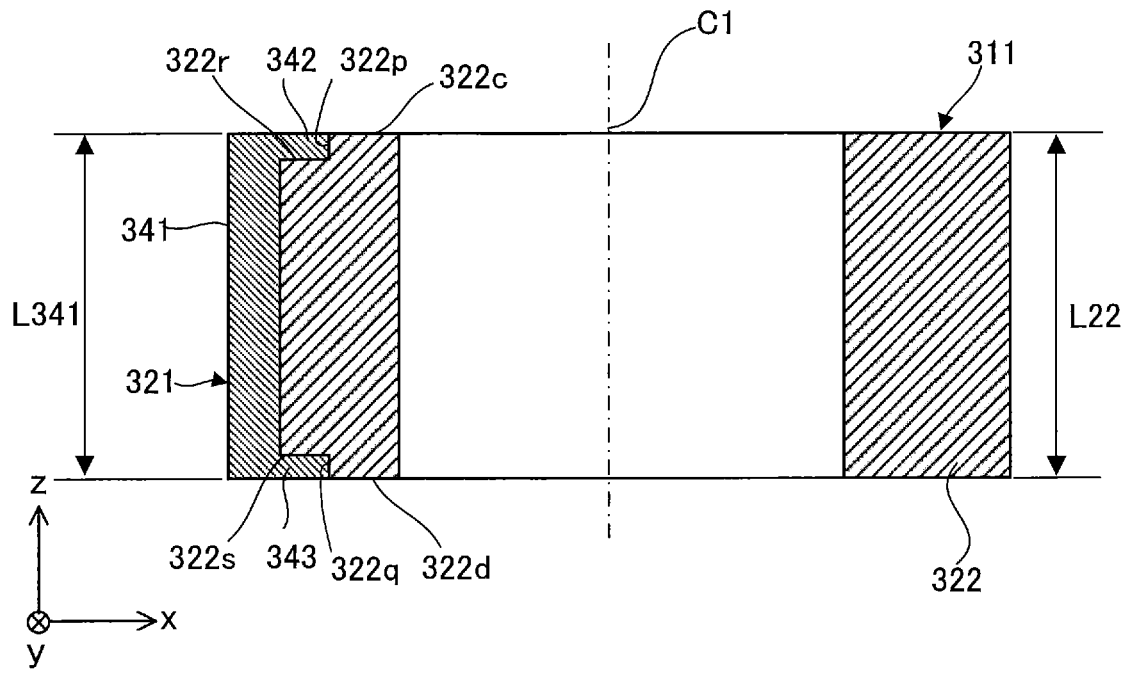
FIG. 13 is a sectional view showing the configuration of a rotor body according to a third embodiment.

FIG. 13 is a sectional view showing the configuration of a rotor body 311 of a rotor according to a third embodiment. In FIG. 13, components identical or corresponding to components shown in FIG. 6 are assigned the same reference characters as in FIG. 6. The rotor body 311 according to the third embodiment differs from the rotor body 11 according to the first embodiment in that a step part is formed on a ferrite bond magnet 322.

As shown in FIG. 13, the rotor body 311 of the rotor includes a rare-earth bond magnet 321 and a ferrite bond magnet 322. The ferrite bond magnet 322 includes a first step part 322p famed on an end part 322c on the +z-axis side and a second step part 322q formed on an end part 322d on the −z-axis side. The first step part 322p is recessed in the −z-axis direction from the end part 322c on the +z-axis side. The second step part 322q is recessed in the +z-axis direction from the end part 322d on the −z-axis side. Incidentally, the ferrite bond magnet 322 may also be configured to include only one of the first step part 322p and the second step part 322q.

The rare-earth bond magnet 321 includes a pillar part 341, a first overhang part 342 and a second overhang part 343. The length L341 of the pillar part 341 in the axial direction is equal to the length L22 of the ferrite bond magnet 322 in the axial direction. The first overhang part 342 is joined to a bottom surface 322r of the first step part 322p. The second overhang part 343 is joined to a bottom surface 322s of the second step part 322q.

Figure 14:
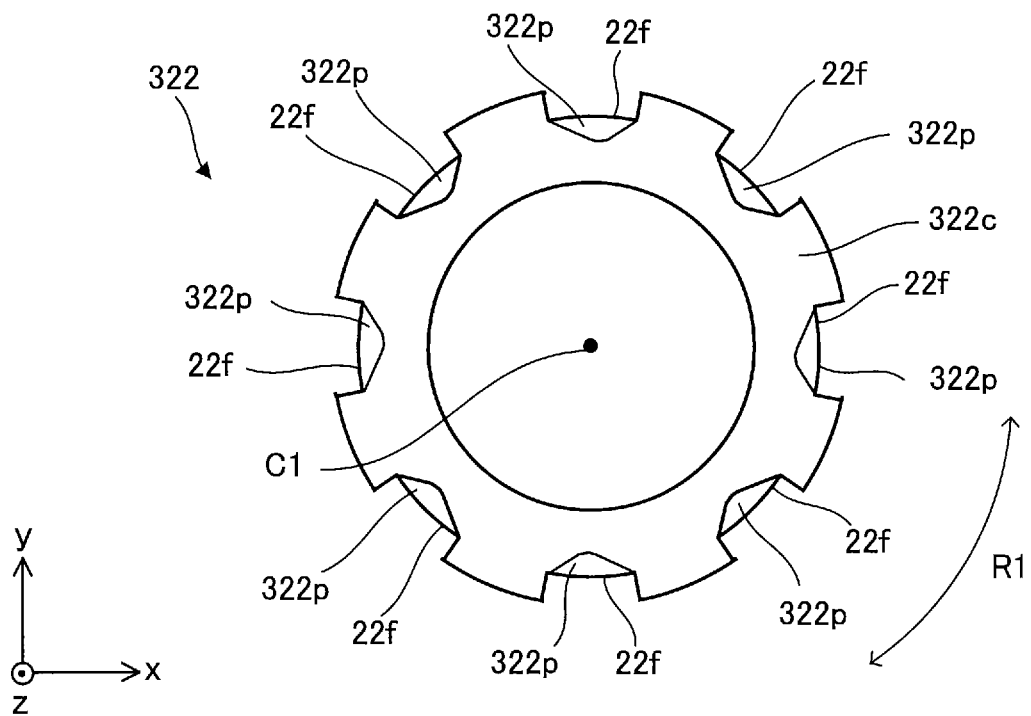
FIG. 14 is a plan view showing the configuration of the second permanent magnet according to the third embodiment.

FIG. 14 is a plan view showing the configuration of the ferrite bond magnet 322 according to the third embodiment. In FIG. 14, components identical or corresponding to components shown in FIG. 4 are assigned the same reference characters as in FIG. 4.

As shown in FIG. 14, the ferrite bond magnet 322 includes a plurality of first step parts 322p arranged at intervals in the circumferential direction R1. The first step part 322p is situated on the inner side in the radial direction relative to the groove part 22f. The width of the first step part 322p in the circumferential direction R1 decreases toward the inner side in the radial direction. The shape of the first step part 322p as viewed in the −z-axis direction is a substantially triangular shape. Namely, the shape of the first step part 322p is the same as the shape of the first overhang part 342. In other words, the shape of the first step part 322p corresponds to the shape of the first overhang part 342. Incidentally, although not shown in the figure, the shape of the second step part 322q (see FIG. 13) as viewed in the −z-axis direction is the same as the shape of the second overhang part 343.

With the rotor according to the third embodiment described above, the first overhang part 342 of the rare-earth bond magnet 321 is joined to the bottom surface 322r of the first step part 322p famed on the ferrite bond magnet 322. With this configuration, the falling off of the rare-earth bond magnet 321 from the ferrite bond magnet 322 can be prevented.

Further, with the rotor according to the third embodiment, the second overhang part 343 of the rare-earth bond magnet 321 is joined to the bottom surface 322s of the second step part 322q formed on the ferrite bond magnet 322. With this configuration, the falling off of the rare-earth bond magnet 321 from the ferrite bond magnet 322 is further less likely to occur.

Furthermore, with the rotor according to the third embodiment, the length L341 of the pillar part 341 of the rare-earth bond magnet 321 in the axial direction is equal to the length L22 of the ferrite bond magnet 322 in the axial direction. With this configuration, in the rotor body 311 according to the third embodiment, the amount of the rare-earth bond magnet 321 can be reduced, and thus the manufacturing cost of the rotor can be reduced.

First Modification of Third Embodiment

Figure 15:
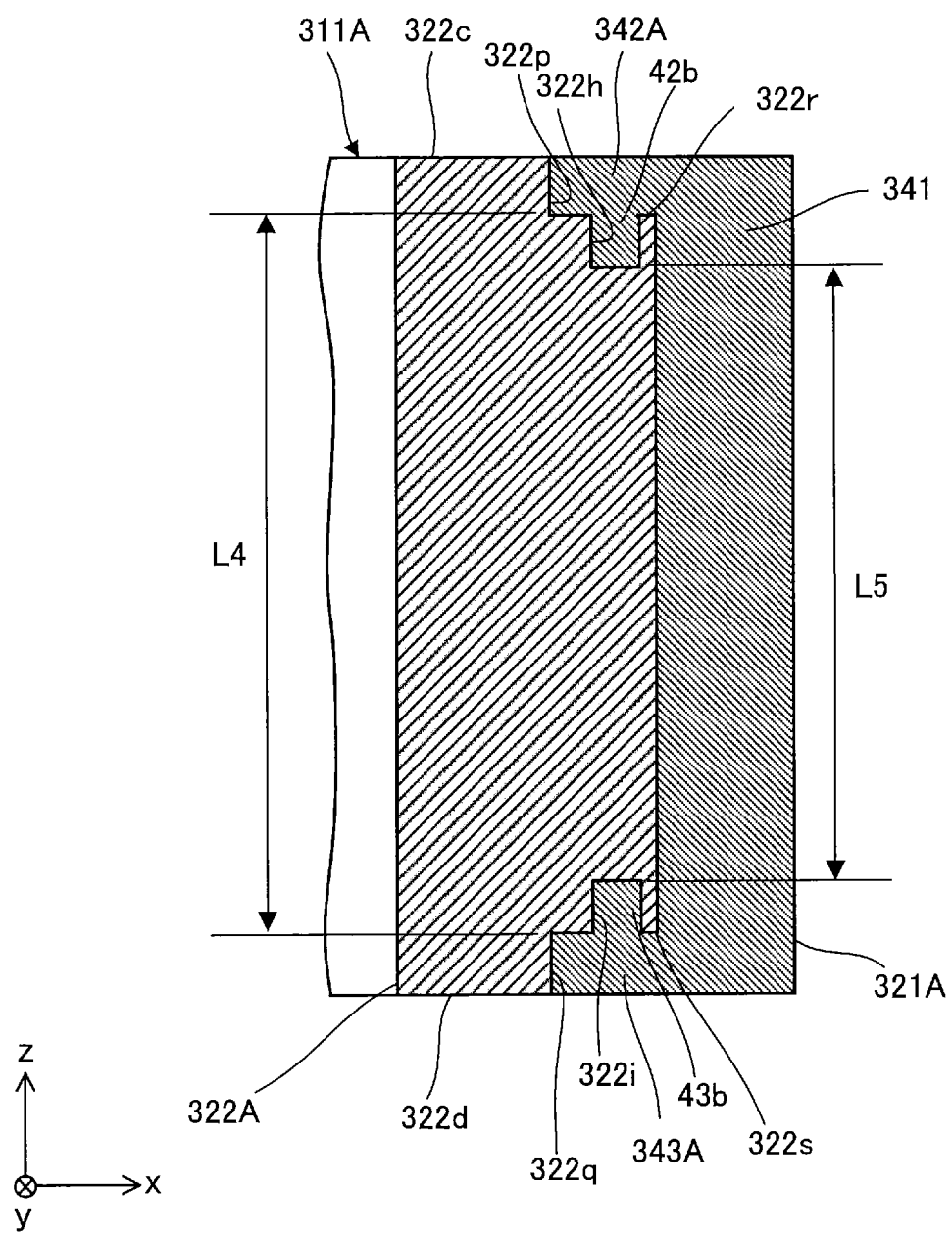
FIG. 15 is a partial sectional view showing the configuration of a rotor body according to a first modification of the third embodiment.

FIG. 15 is a partial sectional view showing the configuration of a rotor body 311A of a rotor according to a first modification of the third embodiment. In FIG. 15, components identical or corresponding to components shown in FIG. 11 or 13 are assigned the same reference characters as in FIG. 11 or 13. The rotor body 311A according to the first modification of the third embodiment differs from the rotor body 311 according to the third embodiment in that an overhang part is fitted with a concave part formed on a step part of a ferrite bond magnet 322A.

As shown in FIG. 15, the rotor body 311A includes a rare-earth bond magnet 321A and a ferrite bond magnet 322A. The ferrite bond magnet 322A includes a first concave part 322h formed on the bottom surface 322r of the first step part 322p and a second concave part 322i formed on the bottom surface 322s of the second step part 322q. Incidentally, the ferrite bond magnet 322A may also be configured to include one of the first concave part 322h and the second concave part 322i. Further, the ferrite bond magnet 322A may also be configured to include a plurality of first concave parts 322h or a plurality of second concave parts 322i.

The rare-earth bond magnet 321A includes the pillar part 341, a first overhang part 342A and a second overhang part 343A. The first overhang part 342A includes a convex part 42b as a first fitting part. The convex part 42b is fitted in the first concave part 322h. The second overhang part 343A includes a convex part 43b as a second fitting part. The convex part 43b is fitted in the second concave part 322i.

In the ferrite bond magnet 322A, the length L4 in the axial direction between the bottom surface 322r of the first step part 322p and the bottom surface 322s of the second step part 322q is greater than the length L5 in the axial direction between the bottom surface of the first concave part 322h and the bottom surface of the second concave part 322i.

With the rotor according to the first modification of the third embodiment described above, the convex part 42b of the first overhang part 342A is fitted in the first concave part 322h famed on the first step part 322p of the ferrite bond magnet 322A. With this configuration, the falling off of the rare-earth bond magnet 321A from the ferrite bond magnet 322A is further less likely to occur.

Further, with the rotor according to the first modification of the third embodiment, the convex part 43b of the second overhang part 343A is fitted in the second concave part 322i famed on the second step part 322q of the ferrite bond magnet 322A. With this configuration, the falling off of the rare-earth bond magnet 321A from the ferrite bond magnet 322A is further less likely to occur.

Second Modification of Third Embodiment

Figure 16:
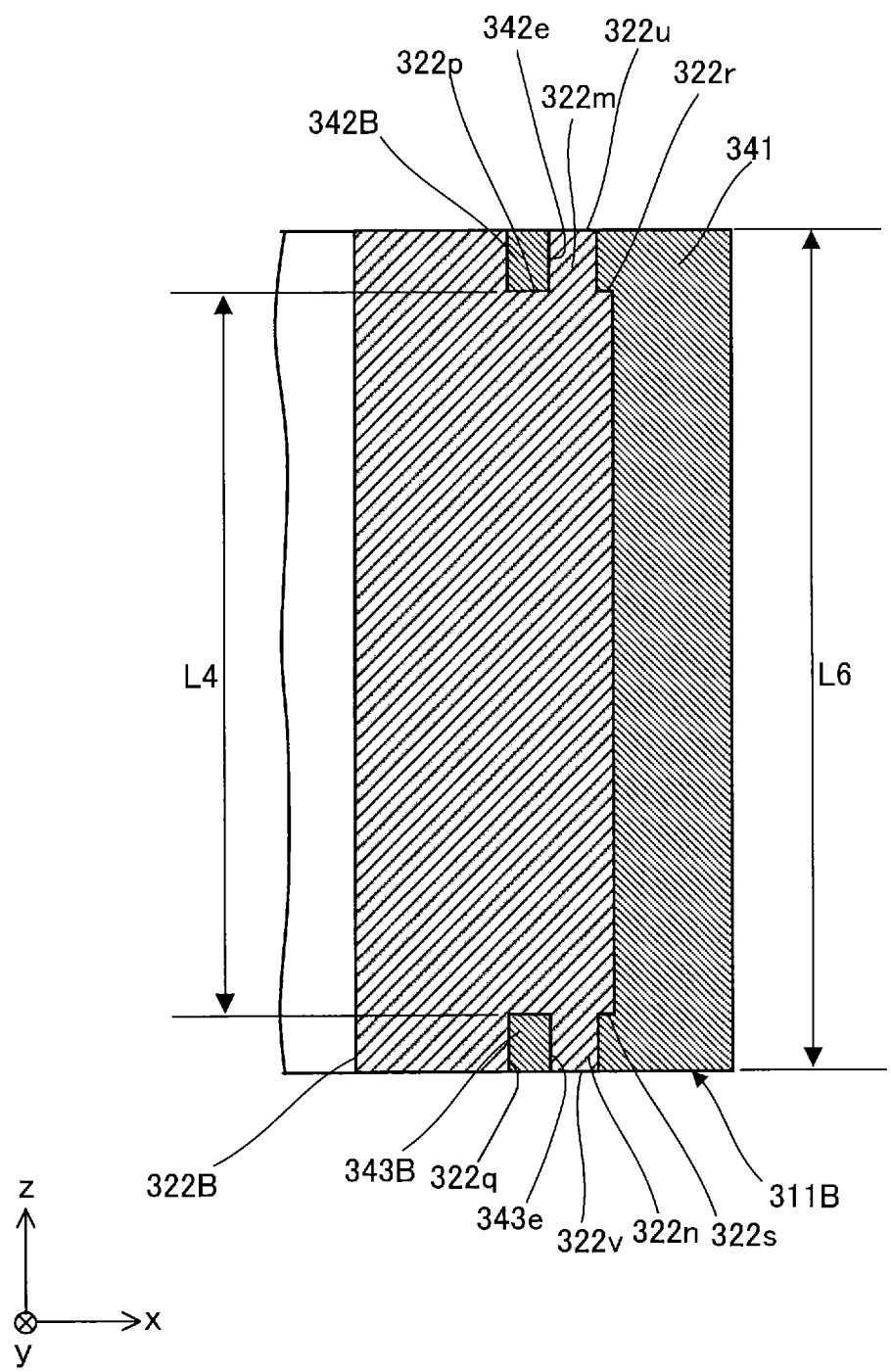
FIG. 16 is a partial sectional view showing the configuration of a rotor body according to a second modification of the third embodiment.

FIG. 16 is a partial sectional view showing the configuration of a rotor body 311B of a rotor according to a second modification of the third embodiment. In FIG. 16, components identical or corresponding to components shown in FIG. 12 or 13 are assigned the same reference characters as in FIG. 12 or 13. The rotor body 311B according to the second modification of the third embodiment differs from the rotor body 311 according to the third embodiment in that an overhang part is fitted with a convex part formed on a step part of a ferrite bond magnet 322B.

As shown in FIG. 16, the rotor body 311B includes a rare-earth bond magnet 321B and a ferrite bond magnet 322B. The ferrite bond magnet 322B includes a first convex part 322m that projects toward the +z-axis side from the bottom surface 322r of the first step part 322p and a second convex part 322n that projects toward the −z-axis side from the bottom surface 322s of the second step part 322q. A surface 322u of the first convex part 322m on the +z-axis side is flush with a surface of the ferrite bond magnet 322B on the +z-axis side. A surface 322v of the second convex part 322n on the −z-axis side is flush with a surface of the ferrite bond magnet 322B on the −z-axis side. Incidentally, the ferrite bond magnet 322B may also be configured to include only one of the first convex part 322m and the second convex part 322n. Further, the ferrite bond magnet 322B may also be configured to include a plurality of first convex parts 322m or a plurality of second convex parts 322n.

The rare-earth bond magnet 321B includes the pillar part 341, a first overhang part 342B and a second overhang part 343B. The first overhang part 342B includes a through hole 342e as a first fitting part. The through hole 342e is fitted on the first convex part 322m. The second overhang part 343B includes a through hole 343e as a second fitting part. The through hole 343e is fitted on the second convex part 322n.

In the ferrite bond magnet 322B, the length L4 in the axial direction between the bottom surface 322r of the first step part 322p and the bottom surface 322s of the second step part 322q is less than the length L6 in the axial direction between the surface 322u of the first convex part 322m on the +z-axis side and the surface 322v of the second convex part 322n on the −z-axis side.

With the rotor according to the second modification of the third embodiment described above, the through hole 342e of the first overhang part 342B is fitted on the first convex part 322m formed on the first step part 322p of the ferrite bond magnet 322B. With this configuration, the falling off of the rare-earth bond magnet 321B from the ferrite bond magnet 322B is further less likely to occur.

Further, with the rotor according to the second modification of the third embodiment, the through hole 343e of the second overhang part 343B is fitted on the second convex part 322n famed on the second step part 322q of the ferrite bond magnet 322B. With this configuration, the falling off of the rare-earth bond magnet 321B from the ferrite bond magnet 322B is further less likely to occur.

Fourth Embodiment

Figure 17A:
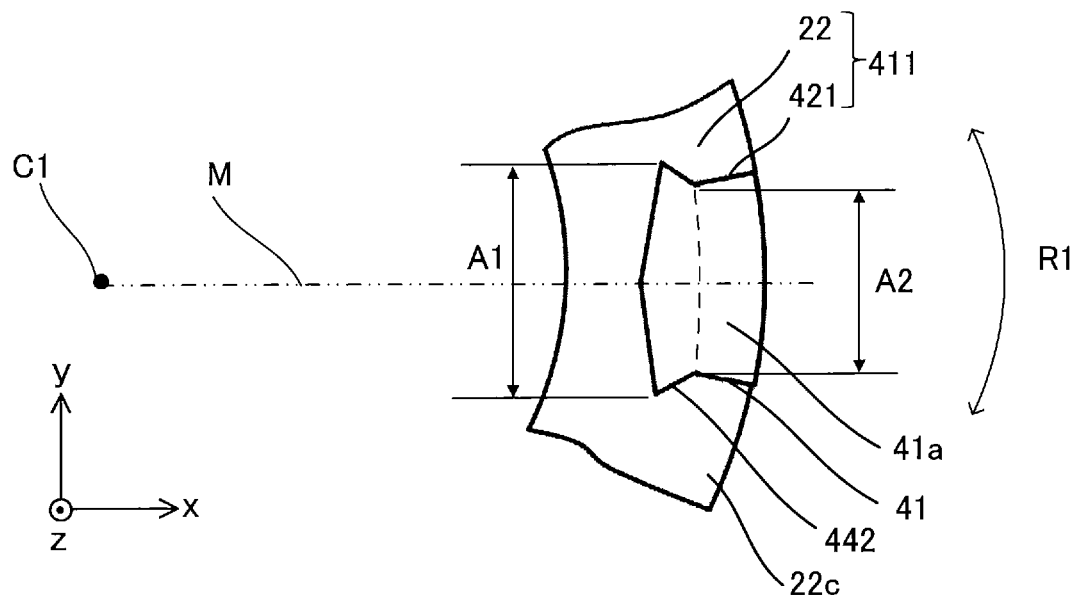
FIG. 17(A) is an enlarged plan view showing a part of the configuration of a rotor body according to a fourth embodiment.
Figure 17B:
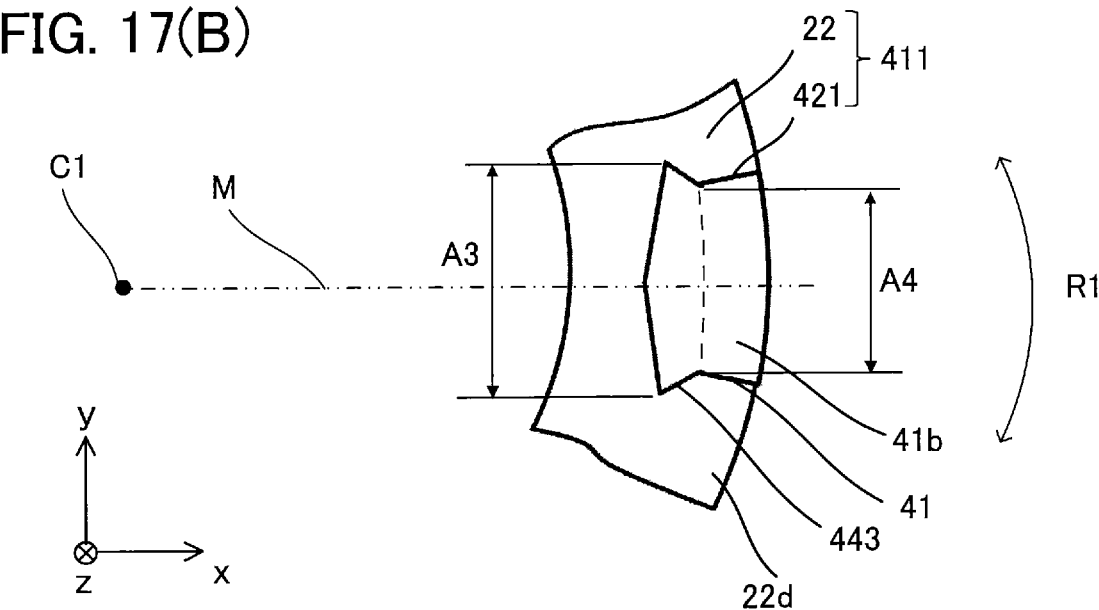
FIG. 17(B) is an enlarged bottom view showing a part of the configuration of the rotor body according to the fourth embodiment.

FIG. 17(A) is an enlarged plan view showing the configuration of a rotor body 411 of a rotor according to a fourth embodiment. FIG. 17(B) is an enlarged bottom view showing the configuration of the rotor body 411 of the rotor according to the fourth embodiment. In FIGS. 17(A) and 17(B), components identical or corresponding to components shown in FIG. 4 are assigned the same reference characters as in FIG. 4. The rotor body 411 according to the fourth embodiment differs from the rotor body 11 according to the first embodiment in the shape of the overhang part.

As shown in FIGS. 17(A) and 17(B), the rotor body 411 of the rotor includes a rare-earth bond magnet 421 and the ferrite bond magnet 22. The rare-earth bond magnet 421 includes the pillar part 41, a first overhang part 442 extending inward in the radial direction from the end part 41a of the pillar part 41 on the +z-axis side, and a second overhang part 443 extending inward in the radial direction from the end part 41b of the pillar part 41 on the −z-axis side.

The length A1 in the circumferential direction R1 of the first overhang part 442 is greater than the length A2 in the circumferential direction R1 of the end part 41a of the pillar part 41 on the +z-axis side. The length A3 in the circumferential direction R1 of the second overhang part 443 is greater than the length A4 in the circumferential direction R1 of the end part 41b of the pillar part 41 on the −z-axis side.

Here, the "length in the circumferential direction R1 of the first overhang part 442 (or the second overhang part 443)" means the length of a straight line in the first overhang part 442 (or the second overhang part 443) extending in a direction orthogonal to a straight line M connecting the axis C1 and the first overhang part 442. Further, the "length in the circumferential direction R1 of the end part 41a on the +z-axis side (or the end part 41b on the −z-axis side)" means the length of the shortest straight line among straight lines in the end part 41a on the +z-axis side (or the end part 41b on the −z-axis side) extending in the direction orthogonal to the straight line M connecting the axis C1 and the pillar part 41.

In the fourth embodiment, the length A3 of the second overhang part 443 is the same as the length A1 of the first overhang part 442. Further, in the pillar part 41, the length A4 of the end part 41b on the −z-axis side is the same as the length A2 of the end part 41a on the +z-axis side.

With the rotor according to the fourth embodiment described above, the length A1 in the circumferential direction R1 of the first overhang part 442 is greater than the length A2 in the circumferential direction R1 of the end part 41a of the pillar part 41 on the +z-axis side. With this configuration, the joining area between the first overhang part 442 and the end part 22c of the ferrite bond magnet 22 on the +z-axis side increases, and thus the falling off of the rare-earth bond magnet 421 from the ferrite bond magnet 22 is further less likely to occur.

Further, with the rotor according to the fourth embodiment, the length A3 in the circumferential direction R1 of the second overhang part 443 is greater than the length A4 in the circumferential direction R1 of the end part 41b of the pillar part 41 on the −z-axis side. With this configuration, the joining area between the second overhang part 443 and the end part 22d of the ferrite bond magnet 22 on the −z-axis side increases, and thus the falling off of the rare-earth bond magnet 421 from the ferrite bond magnet 22 is further less likely to occur.

First Modification of Fourth Embodiment

Figure 18:
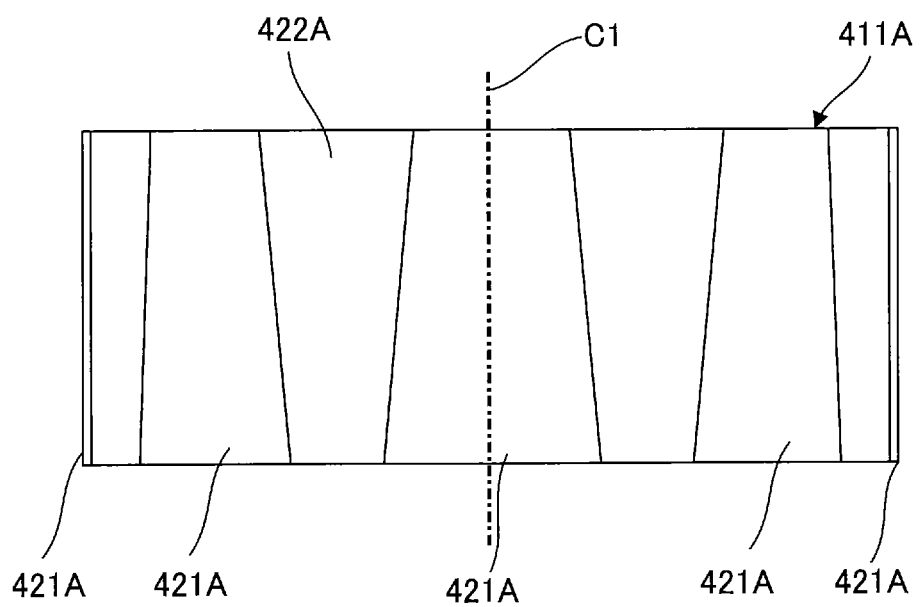
FIG. 18 is a side view showing the configuration of a rotor body according to a first modification of the fourth embodiment.
Figure 19A:
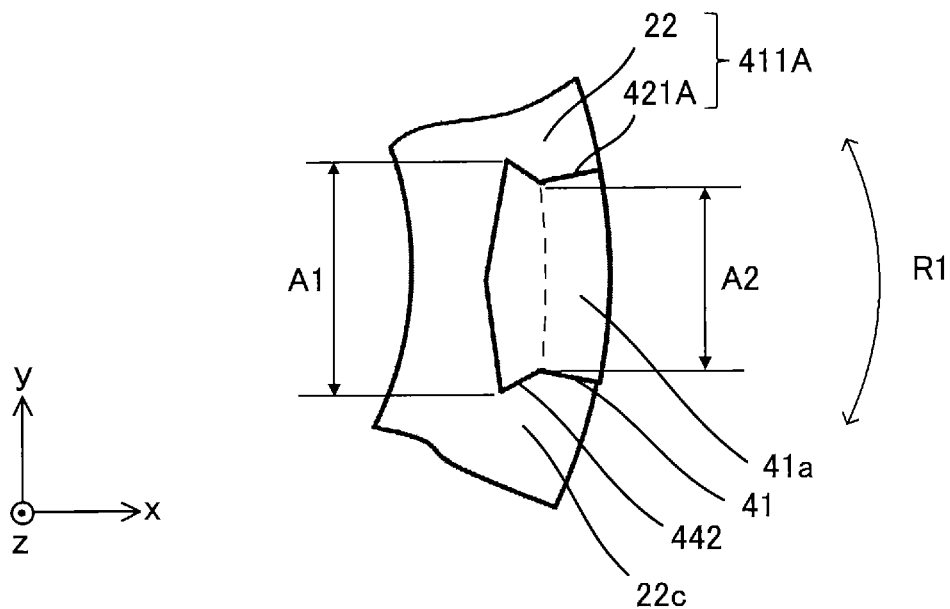
FIG. 19(T) is an enlarged plan view showing the configuration of the rotor body according to the first modification of the fourth embodiment.
FIG. 19(B) is an enlarged bottom view showing the configuration of the rotor body according to the first modification of the fourth embodiment.
Figure 19B:
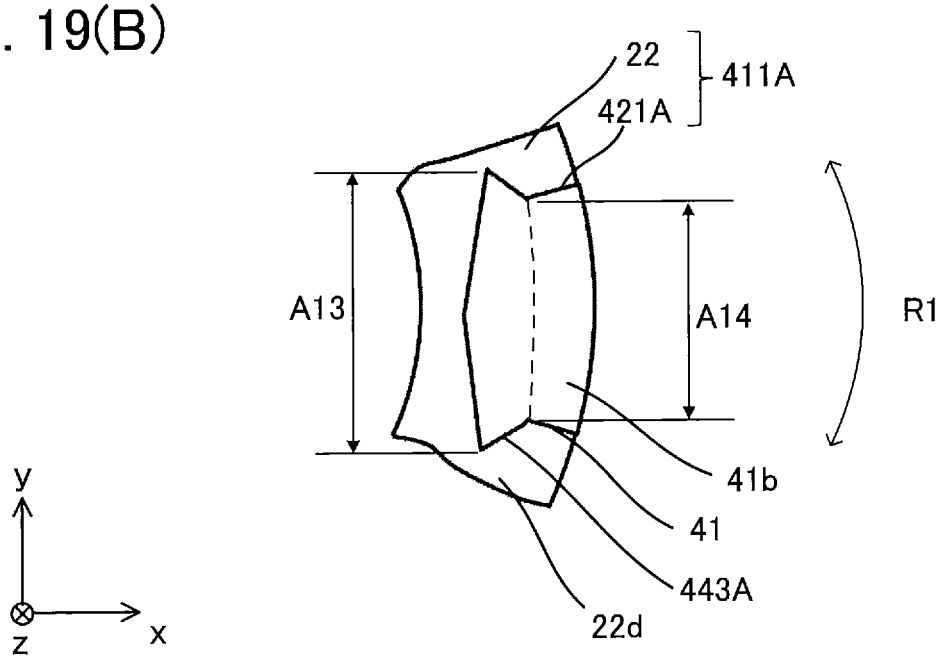

FIG. 18 is a side view showing the configuration of a rotor body 411A of a rotor according to a first modification of the fourth embodiment. FIG. 19(A) is an enlarged plan view showing the configuration of the rotor body 411A of the rotor according to the first modification of the fourth embodiment. FIG. 19(B) is an enlarged bottom view showing the configuration of the rotor body 411A of the rotor according to the first modification of the fourth embodiment. The rotor body 411A according to the first modification of the fourth embodiment differs from the rotor body 411 according to the fourth embodiment in the shape of a second overhang part.

As shown in FIG. 18, the rotor body 411A includes a plurality of rare-earth bond magnets 421A and a ferrite bond magnet 422A.

As shown in FIGS. 19(A) and 19(B), the rare-earth bond magnet 421A includes the pillar part 41, a first overhang part 442A extending inward in the radial direction from the end part 41a of the pillar part 41 on the +z-axis side, and a second overhang part 443A extending inward in the radial direction from the end part 41b of the pillar part 41 on the −z-axis side.

In the first modification of the fourth embodiment, the length A13 of the second overhang part 443A differs from the length A1 of the first overhang part 442A. Specifically, the length A13 of the second overhang part 443A is greater than the length A1 of the first overhang part 442A. Namely, in the first modification of the fourth embodiment, the shapes of the first overhang part 442A and the second overhang part 443A differ from each other. Incidentally, it is sufficient that the length A13 is less than the length A1.

Further, in the first modification of the fourth embodiment, in the pillar part 41, the length A14 of the end part 41b on the −z-axis side differs from the length A2 of the end part 41a on the +z-axis side. Namely, in the rare-earth bond magnet 421, the length in the circumferential direction R1 is not constant in the overhang parts on both sides in the axial direction. Specifically, in the pillar part 41, the length A14 of the end part 41b on the −z-axis side is greater than the length A2 of the end part 41a on the +z-axis side. Incidentally, it is sufficient that the length A14 is less than the length A2.

With the rotor according to the first modification of the fourth embodiment described above, the length A13 of the second overhang part 443A differs from the length A1 of the first overhang part 442A. With this configuration, the expansion amount (or the contraction amount) of the first overhang part 442A and the expansion amount (or the contraction amount) of the second overhang part 443A differ from each other. Accordingly, force with which the rare-earth bond magnet 421A is fixed to the ferrite bond magnet 422A is enhanced, and thus the falling off of the rare-earth bond magnet 421A from the ferrite bond magnet 422A is further less likely to occur.

Second Modification of Fourth Embodiment

Figure 20A:
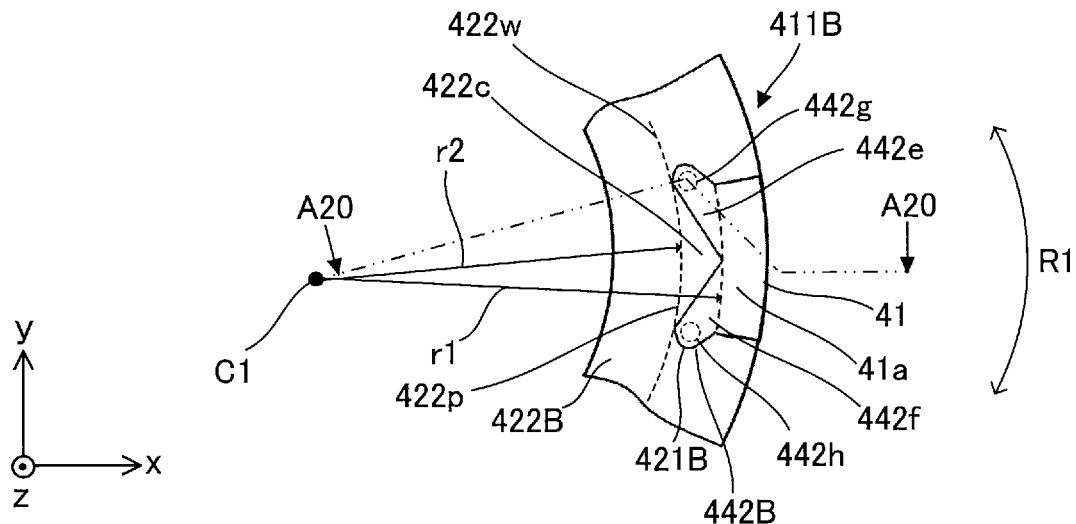
FIG. 20(A) is an enlarged plan view showing a part of the configuration of a rotor body according to a second modification of the fourth embodiment.

FIG. 20(A) is an enlarged plan view showing the configuration of a rotor body 411B of a rotor according to a second modification of the fourth embodiment. In FIG. 20(A), components identical or corresponding to components shown in FIG. 4 are assigned the same reference characters as in FIG. 4. The rotor body 411B according to the second modification of the fourth embodiment differs from the rotor body 11 according to the first embodiment in the shape of an overhang part.

As shown in FIG. 20(A), the rotor body 411B includes a rare-earth bond magnet 421B and a ferrite bond magnet 422B. The rare-earth bond magnet 421B includes the pillar part 41 and a first overhang part 442B extending inward in the radial direction from the end part 41a of the pillar part 41 on the +z-axis side.

The first overhang part 442B includes a first part 442e extending toward one side in the circumferential direction R1 from the end part 41a of the pillar part 41 on the +z-axis side and a second part 442f extending toward the other side in the circumferential direction R1 from the end part 41a of the pillar part 41 on the +z-axis side. In the second modification of the fourth embodiment, the first part 442e and the second part 442f extend so that the distance between the first part 442e and the second part 442f in the circumferential direction R1 increases. With this configuration, the length in the circumferential direction R1 of the first overhang part 442B is greater than the length A2 (see FIG. 17) in the circumferential direction R1 of the end part 41a of the pillar part 41 on the +z-axis side. An end part 422c of the ferrite bond magnet 422B on the +z-axis side is arranged between the first part 442e and the second part 442f.

Figure 20B:
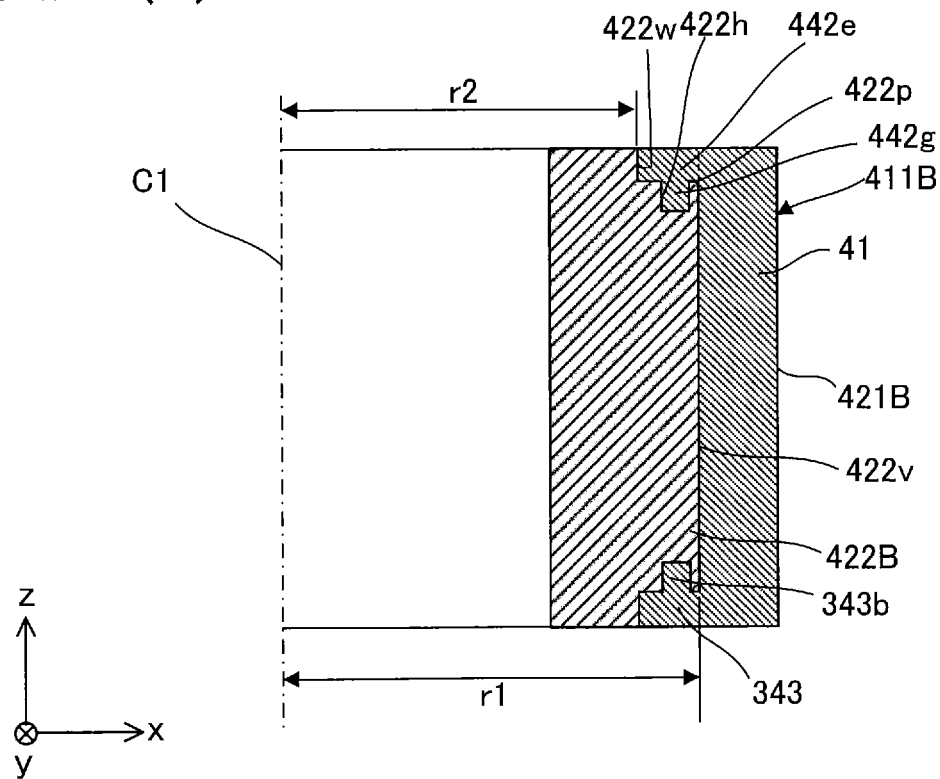
FIG. 20(B) is a sectional view of the rotor body shown in FIG. 20(A) taken along the line A20-A20.

FIG. 20(B) is a sectional view of the rotor body 411B shown in FIG. 20(A) taken along the line A20-A20. In FIG. 20(B), components identical or corresponding to components shown in FIG. 15 are assigned the same reference characters as in FIG. 15.

As shown in FIGS. 20(A) and 20(B), the first part 442e includes a convex part 442g as a fitting part. The convex part 442g is fitted in a concave part 422h formed on a step part 422p of the ferrite bond magnet 422B. The second part 442f includes a convex part 442h as a fitting part. The convex part 442h is fitted in a concave part (not shown) formed on the ferrite bond magnet 422B. Incidentally, the first part 442e and the second part 442f may also be configured to include fitting parts (for example, through holes or concave parts) to be fitted on convex parts famed on the ferrite bond magnet 422B.

Here, when r1 represents the distance from the axis C1 to an end part 422v of the step part 422p on the outer side in the radial direction and r2 represents the distance from the axis C1 to an end part 422w of the step part 422p on the inner side in the radial direction, the distance r1 is longer than the distance r2.

With the rotor according to the second modification of the fourth embodiment described above, the first overhang part 442B includes the first part 442e and the second part 442f extending toward both sides in the circumferential direction from the end part 41a of the pillar part 41 on the +z-axis side, and the ferrite bond magnet 422B is arranged between the first part 442e and the second part 442f. With this configuration, the falling off of the rare-earth bond magnet 421B can be prevented while reducing the amount of the rare-earth bond magnet 421B in the rotor body 411B. Further, in the case where fitting parts fitted with the ferrite bond magnet 422B are provided on both sides of the first overhang part 442B in the circumferential direction, a part (i.e., a central part in the circumferential direction) of the rare-earth bond magnet 421B unnecessary for the joining with the ferrite bond magnet 422B can be reduced.

Fifth Embodiment

Figure 21:
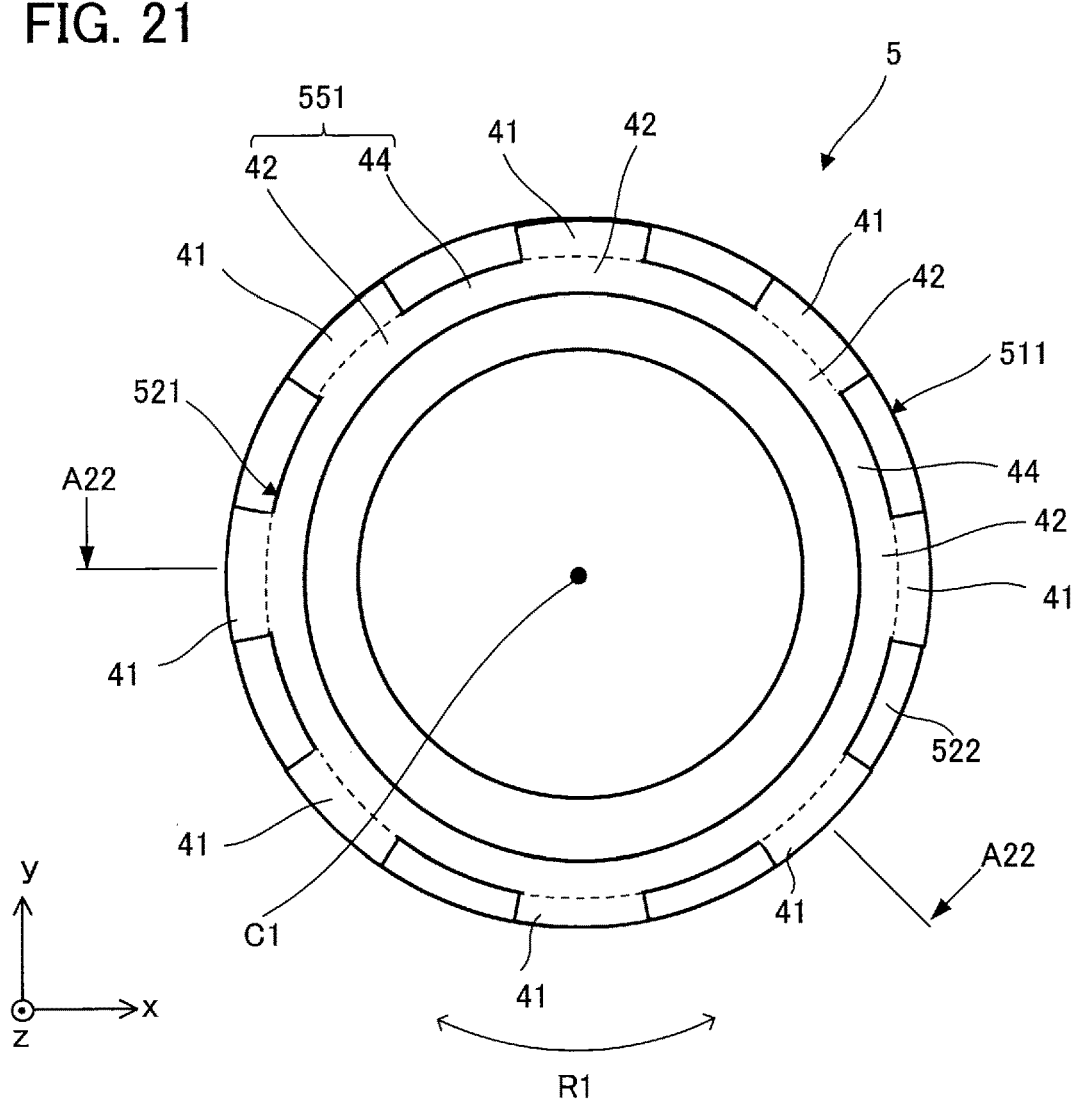
FIG. 21 is a plan view showing the configuration of a rotor body according to a fifth embodiment.
Figure 22:
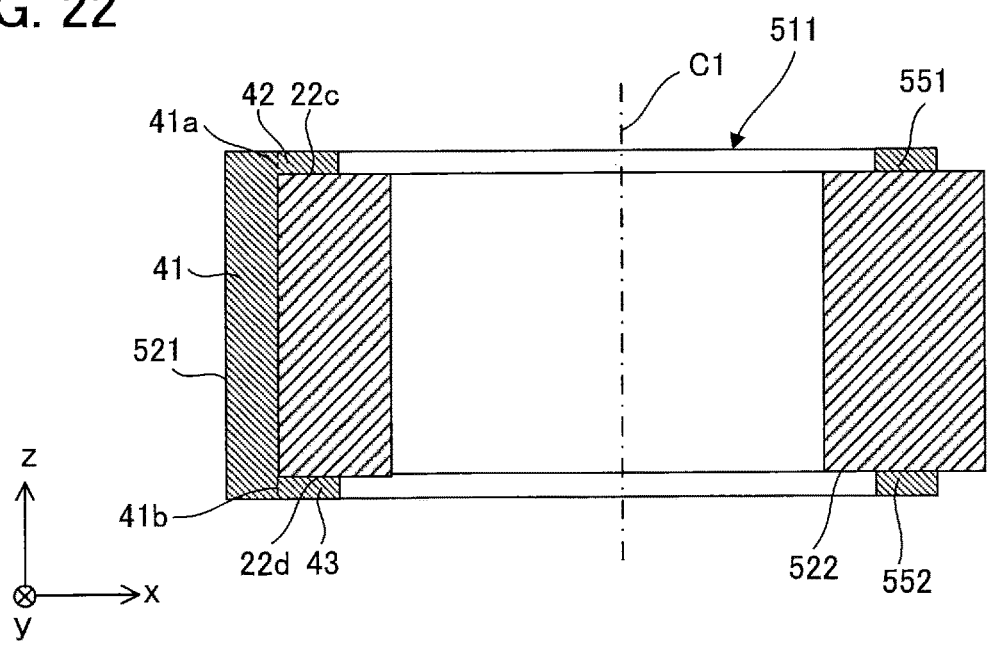
FIG. 22 is a sectional view showing the configuration of the rotor body according to the fifth embodiment.

FIG. 21 is a plan view showing the configuration of a rotor body 511 of a rotor according to a fifth embodiment. FIG. 22 is a sectional view of the rotor body 511 shown in FIG. 21 taken along the line A22-A22. In FIGS. 21 and 22, components identical or corresponding to components shown in FIG. 1 or 6 are assigned the same reference characters as in FIG. 1 or 6. The rotor body 511 according to the fifth embodiment differs from the rotor body 11 according to the first embodiment in the configuration of a rare-earth bond magnet 521.

As shown in FIGS. 21 and 22, the rotor body 511 includes a rare-earth bond magnet 521 and a ferrite bond magnet 522. The rare-earth bond magnet 521 includes a plurality of pillar parts 41 arranged at intervals in the circumferential direction R1 and ring parts 551 and 552 situated on the inner side in the radial direction relative to the plurality of pillar parts 41. The ring part 551 is joined to the end part 22c of the ferrite bond magnet 522 on the +z-axis side. The ring part 551 is formed of a plurality of first overhang parts 42 and a connection part 44 connecting the plurality of first overhang parts 42 adjoining in the circumferential direction. The ring part 552 is joined to the end part 22d of the ferrite bond magnet 522 on the −z-axis side. The ring part 552 is formed of a plurality of second overhang parts 43 and a connection part (not shown) connecting the plurality of second overhang parts 43 adjoining in the circumferential direction. Incidentally, the rare-earth bond magnet 521 may also be configured to include only one of the ring part 551 on the +z-axis side and the ring part 552 on the −z-axis side.

With the rotor according to the fifth embodiment described above, the rare-earth bond magnet 521 includes the ring part 551 including the connection part 44 connecting the plurality of first overhang parts 42 adjoining in the circumferential direction R1. With this configuration, the falling off of the rare-earth bond magnet 521 from the ferrite bond magnet 522 is further less likely to occur.

Further, with the rotor according to the fifth embodiment, the rare-earth bond magnet 521 further includes the ring part 552 including the connection part connecting the plurality of second overhang parts 43 adjoining in the circumferential direction R1. With this configuration, the falling off of the rare-earth bond magnet 521 from the ferrite bond magnet 522 is further less likely to occur.

Modification of Fifth Embodiment

Figure 23:
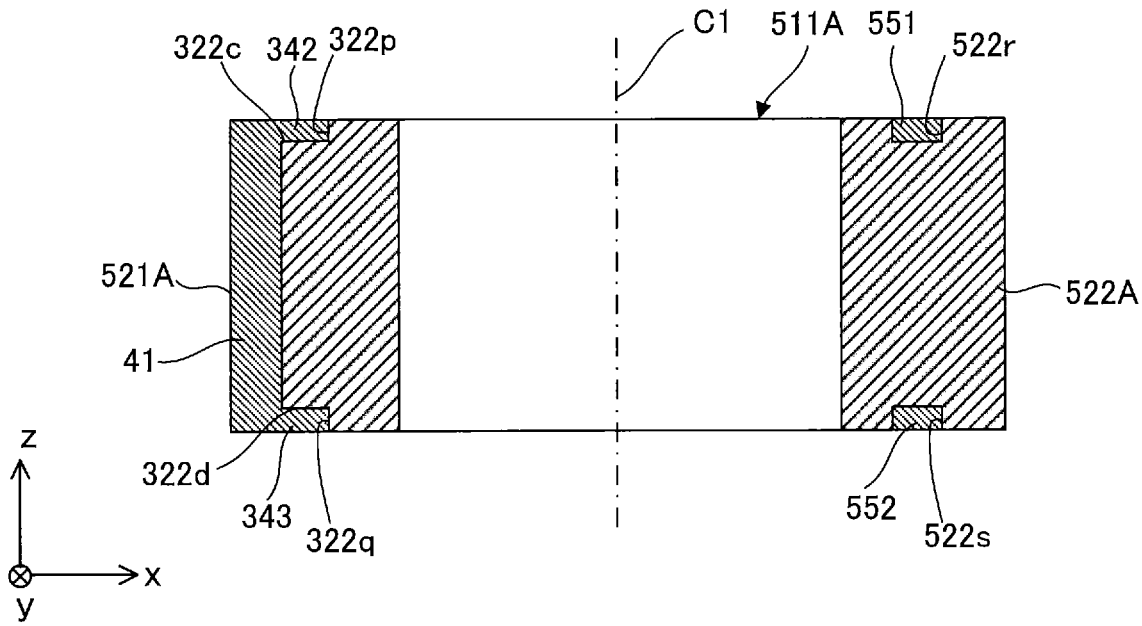
FIG. 23 is a sectional view showing the configuration of a rotor body according to a modification of the fifth embodiment.
Figure 24:
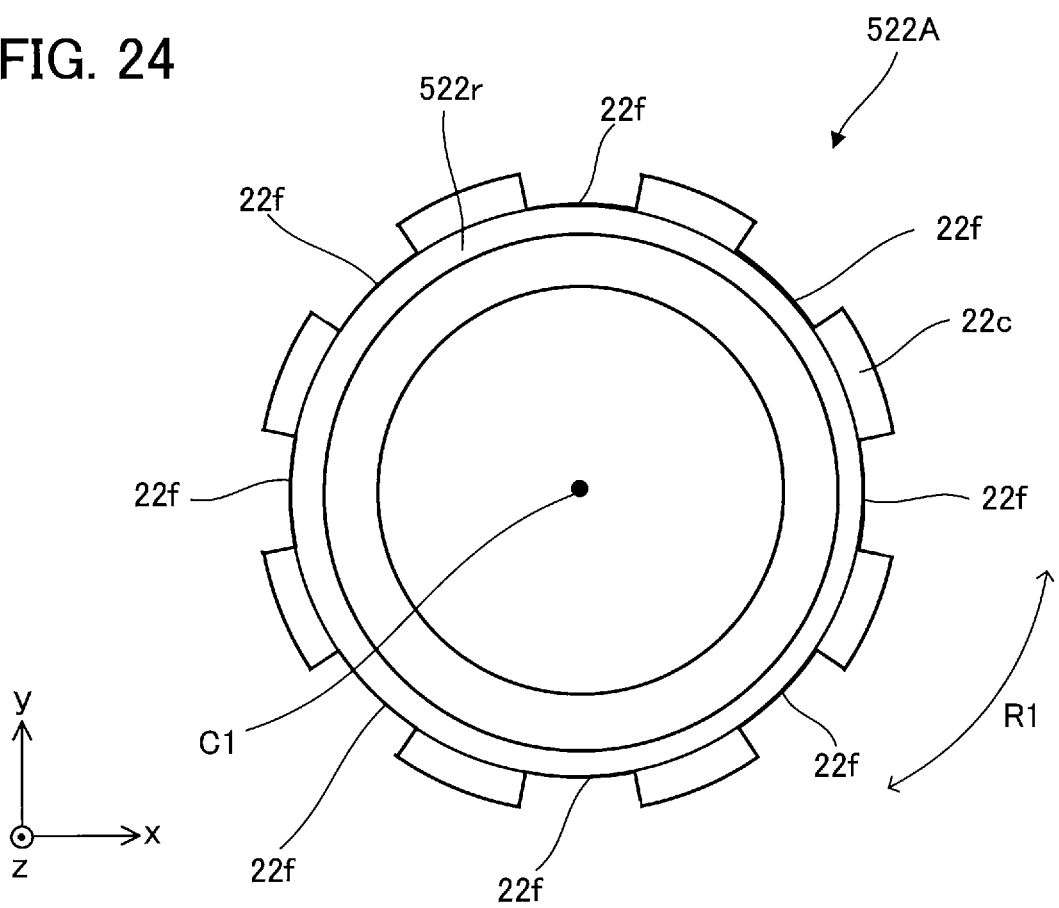
FIG. 24 is a plan view showing the configuration of the second permanent magnet according to the modification of the fifth embodiment.

FIG. 23 is a sectional view showing the configuration of a rotor body 511A of a rotor according to a modification of the fifth embodiment. FIG. 24 is a plan view showing the configuration of a ferrite bond magnet 522A according to the modification of the fifth embodiment. In FIGS. 23 and 24, components identical or corresponding to components shown in FIG. 21 or 22 are assigned the same reference characters as in FIG. 21 or 22. The rotor body 511A according to the modification of the fifth embodiment differs from the rotor body 511 according to the fifth embodiment in that the ring parts 551 and 552 are respectively arranged in ring-shaped concave parts 522r and 522s of the ferrite bond magnet 522A.

As shown in FIG. 23, the rotor body 511A includes a rare-earth bond magnet 521A and a ferrite bond magnet 522A. The ring part 551 of the rare-earth bond magnet 521A is arranged in the ring-shaped concave part 522r as a concave part formed on the end part 22c of the ferrite bond magnet 522A on the +z-axis side. An end face of the ring part 551 is flush with an end face of the ferrite bond magnet 522A on the +z-axis side. The ring part 552 is arranged in the ring-shaped concave part 522s formed on the end part 22d of the ferrite bond magnet 522A on the −z-axis side. An end face of the ring part 552 on the −z-axis side is flush with an end face of the ferrite bond magnet 522A on the −z-axis side.

As shown in FIG. 24, in the end part 22c of the ferrite bond magnet 522A on the +z-axis side, the ring-shaped concave part 522r is situated on the inner side in the radial direction relative to the groove parts 22f. The shape of the ring-shaped concave part 522r as viewed in the −z-axis direction is a ring shape about the axis C1.

With the rotor according to the modification of the fifth embodiment described above, the ferrite bond magnet 522A includes the ring-shaped concave parts 522r and 522s in which the ring parts 551 and 552 are arranged. With this configuration, the amount of the rare-earth bond magnet 521A in the rotor body 511A is reduced, and thus the manufacturing cost of the rotor can be reduced.

Sixth Embodiment

Figure 25:
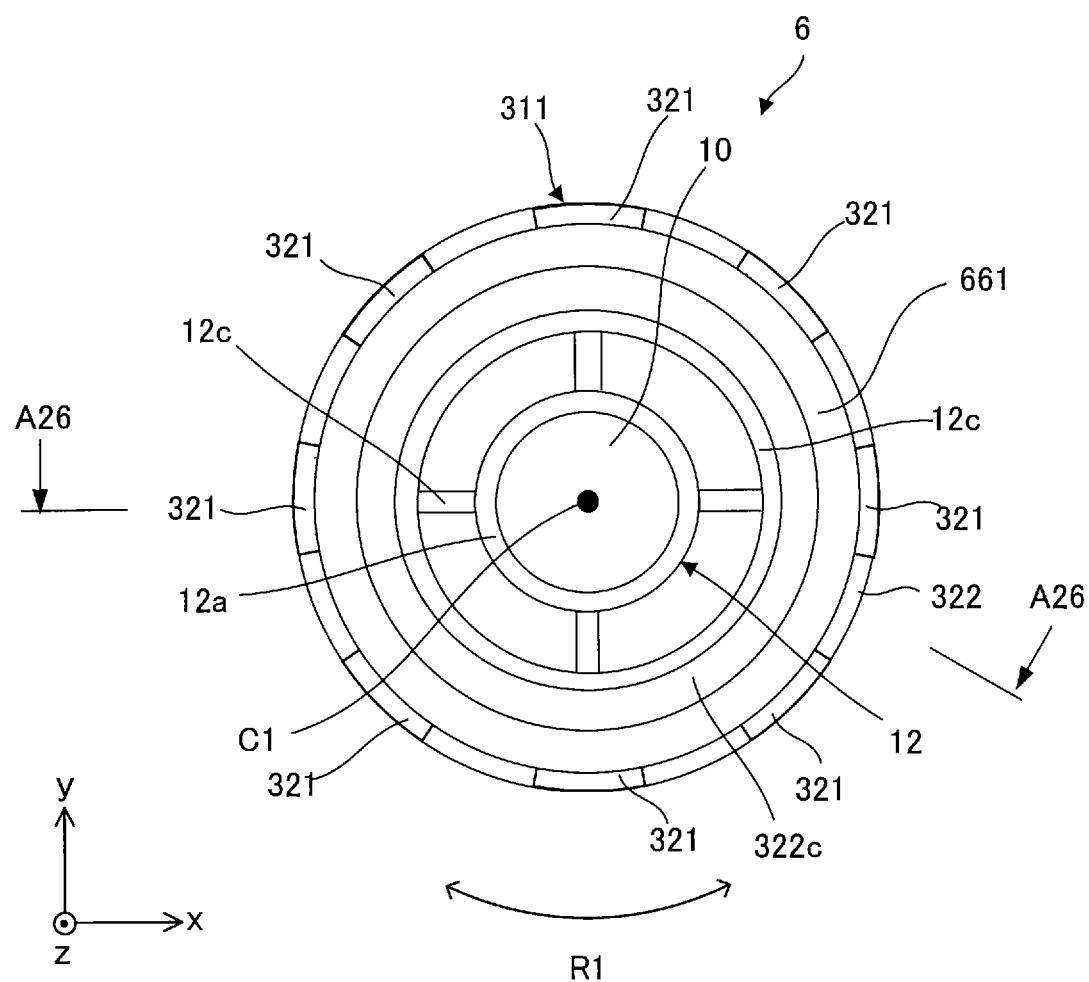
FIG. 25 is a plan view showing the configuration of a rotor according to a sixth embodiment.
Figure 26:
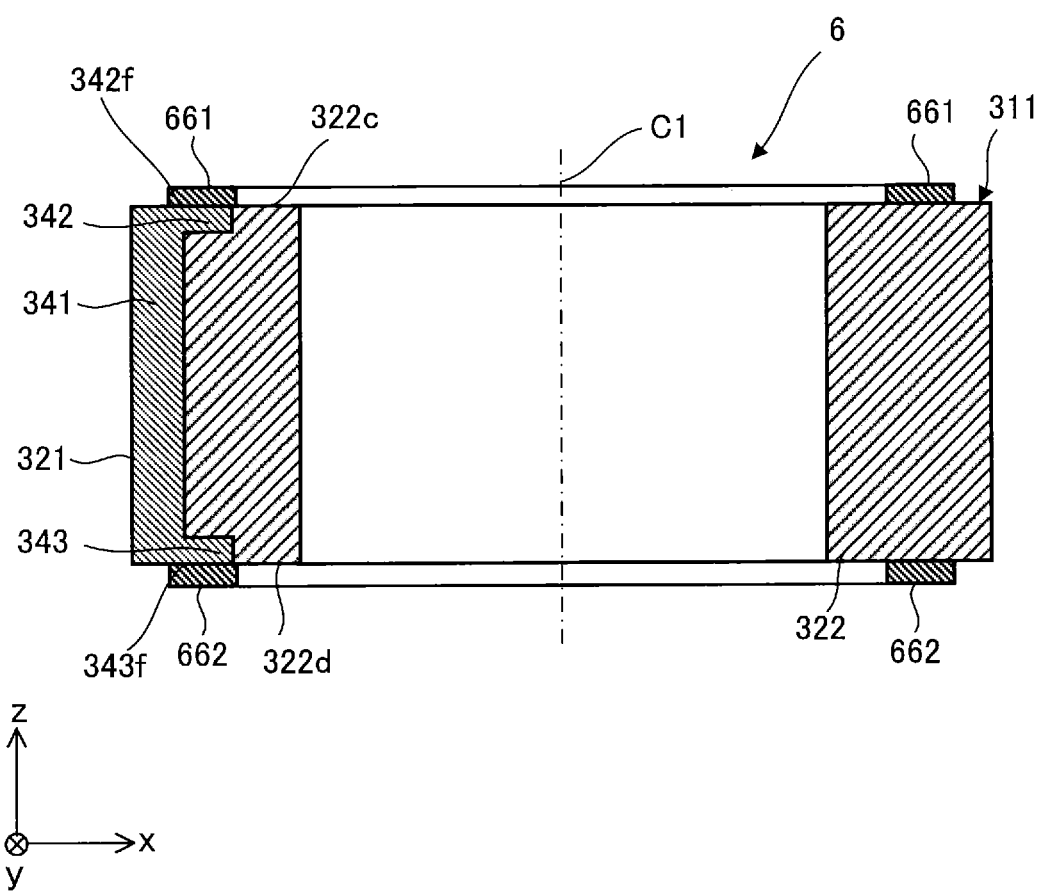
FIG. 26 is a sectional view of the rotor shown in FIG. 25 taken along the line A26-A26.

FIG. 25 is a plan view showing the configuration of a rotor 6 according to a sixth embodiment. FIG. 26 is a sectional view of the rotor 6 shown in FIG. 25 taken along the line A26-A26. In FIGS. 25 and 26, components identical or corresponding to components shown in FIG. 13 are assigned the same reference characters as in FIG. 13. The rotor 6 according to the sixth embodiment differs from the rotor according to any one of the first to fifth embodiments in that the rotor 6 includes ring members 661 and 662. Incidentally, the rotor 6 will be described below with reference to FIGS. 25 and 26 by using an example in which the rotor 6 includes the rotor body 311 according to the third embodiment.

As shown in FIGS. 25 and 26, the rotor 6 includes the shaft 10, the rotor body 311, the connection part 12, and the ring members 661 and 662. Each of the ring members 661 and 662 is a member having a ring shape about the axis C1. The ring members 661 and 662 are formed of a resin such as unsaturated polyester resin, for example.

The ring member 661 is situated on the +z-axis side relative to the rotor body 311. The ring member 661 is fixed to an end face 342f of the first overhang part 342 on the +z-axis side and the end face 322c of the ferrite bond magnet 322 on the +z-axis side. Namely, when the rotor 6 is viewed in the −z-axis direction, the ring member 661 is arranged at a position overlapping with an interface surface of the first overhang part 342 and the ferrite bond magnet 322.

The ring member 662 is situated on the −z-axis side relative to the rotor body 311. The ring member 662 is fixed to an end face 343f of the second overhang part 343 on the −z-axis side and the end face 322d of the ferrite bond magnet 322 on the −z-axis side. Namely, when the rotor 6 is viewed in the +z-axis direction, the ring member 662 is arranged at a position overlapping with an interface surface of the second overhang part 343 and the ferrite bond magnet 322. Incidentally, the rotor 6 may also be configured to include only one of the ring member 661 on the +z-axis side and the ring member 662 on the −z-axis side.

With the rotor 6 according to the sixth embodiment described above, on the +z-axis side of the rotor body 311, the ring member 661 is fixed to the first overhang part 342 and the ferrite bond magnet 322. With this configuration, the falling off of the rare-earth bond magnet 321 from the ferrite bond magnet 322 is further less likely to occur.

Further, with the rotor 6 according to the sixth embodiment, on the −z-axis side of the rotor body 311, the ring member 662 is fixed to the second overhang part 343 and the ferrite bond magnet 322. With this configuration, the falling off of the rare-earth bond magnet 321 from the ferrite bond magnet 322 is further less likely to occur.

Modification of Sixth Embodiment

Figure 27:
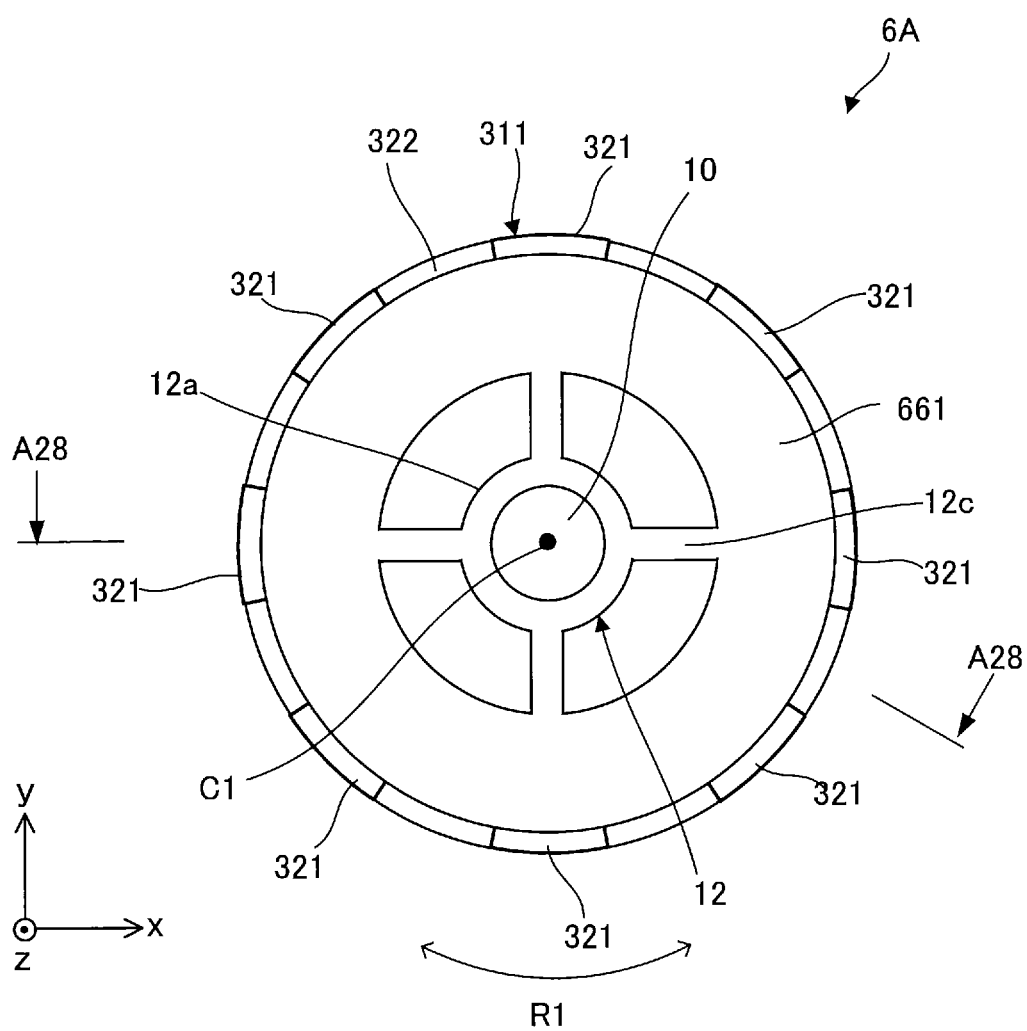
FIG. 27 is a plan view showing the configuration of a rotor according to a modification of the sixth embodiment.
Figure 28:
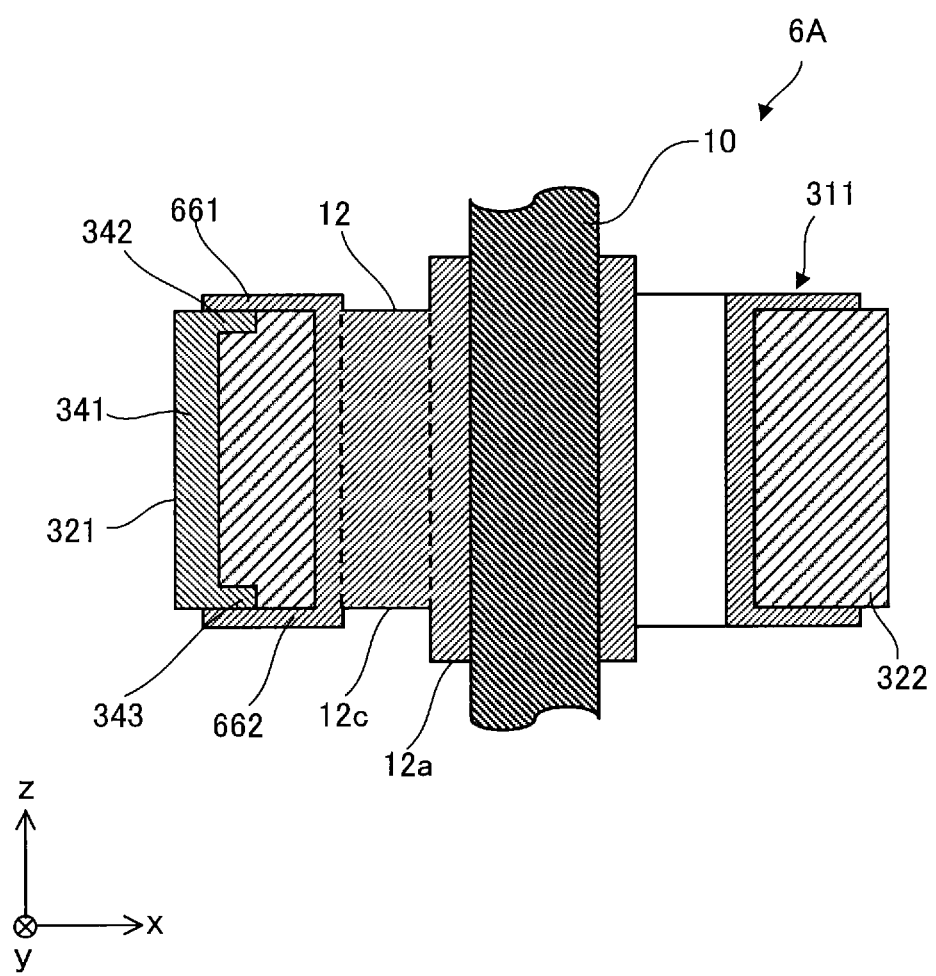
FIG. 28 is a sectional view of the rotor shown in FIG. 27 taken along the line A28-A28.

FIG. 27 is a plan view showing the configuration of a rotor 6A according to a modification of the sixth embodiment. FIG. 28 is a sectional view of the rotor 6A shown in FIG. 27 taken along the line A28-A28. The rotor 6A according to the modification of the sixth embodiment differs from the rotor 6 according to the sixth embodiment in that the ring members 661 and 662 are integrated with the connection part 12.

As shown in FIGS. 27 and 28, the rotor 6A includes the shaft 10, the rotor body 311, the ring members 661 and 662 as a first resin part, and the connection part 12 as a second resin part. The ring members 661 and 662 are connected to the connection part 12 by the integral molding of the ring members 661 and 662 and the connection part 12. Specifically, the ring members 661 and 662 are connected to the ribs 12c of the connection part 12. Namely, in the modification of the sixth embodiment, the shaft 10 and the rotor body 311 are connected to each other via the connection part 12 and the ring members 661 and 662.

With the rotor 6A according to the modification of the sixth embodiment described above, the ring members 661 and 662 are connected to the connection part 12. With this configuration, when the shaft 10 and the rotor body 11 are integrally molded together via the connection part 12 formed of a resin, the ring members 661 and 662 can also be molded at the same time, and thus manufacturing steps of the rotor 6 can be reduced.

Here, the natural frequency of the rotor 6A changes depending on the rigidity of the rotor 6A. The rigidity of the rotor 6A can be adjusted by changing the width and the length of each rib 12c and the number of ribs 12c. In the modification of the sixth embodiment, the length of the rib is increased since the ribs 12c are connected to ring members 661 and 662. Thus, the rigidity of the rotor 6A is changed and the natural frequency of the rotor 6A is changed. With this configuration, the occurrence of resonance can be inhibited and vibrational characteristics of the rotor 6A can be adjusted.

Further, the inertia moment of the rotor 6A changes depending on the mass of the rotor 6A. The mass of the rotor 6A can be adjusted by changing the width and the length of each rib 12c and the number of ribs 12c. In the modification of the sixth embodiment, as the inertia moment increases, higher starting torque is needed, but the rotation of the rotor 6A can be more stabilized. Namely, in the modification of the sixth embodiment, the ribs 12c are connected to the ring members 661 and 662, and thus the natural frequency and the inertia moment of the rotor 6A can be adjusted by changing the shape of each rib 12c. Incidentally, the natural frequency and the inertia moment of the rotor 6A may also be changed by changing the number of ribs 12c.

Seventh Embodiment

Figure 29:
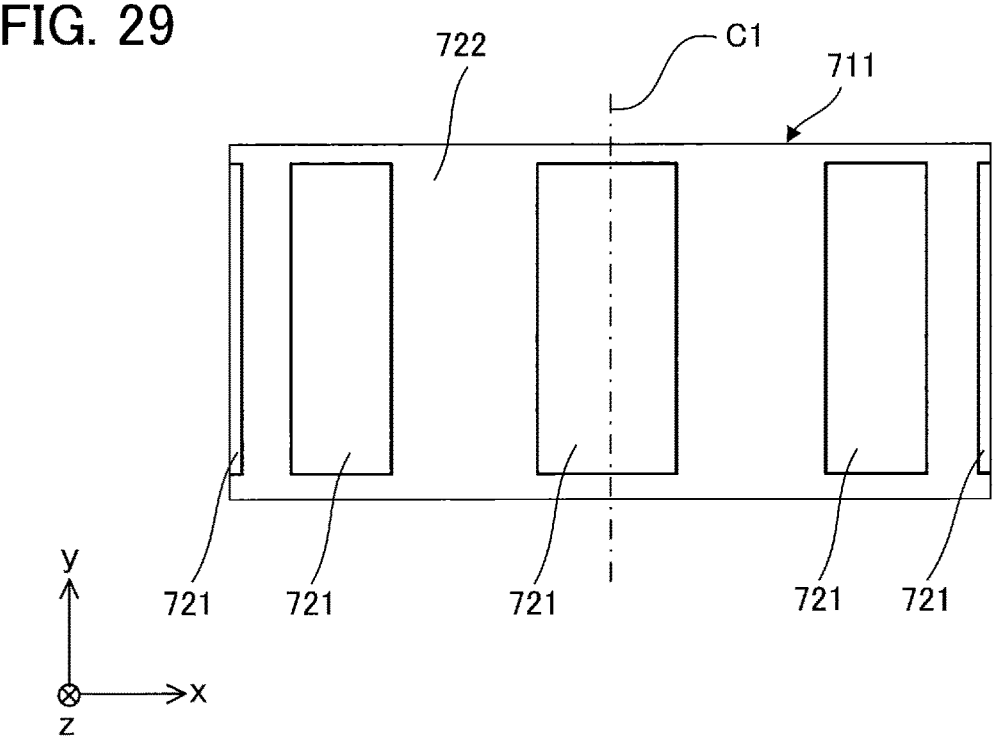
FIG. 29 is a side view showing the configuration of a rotor body according to a seventh embodiment.
Figure 30:
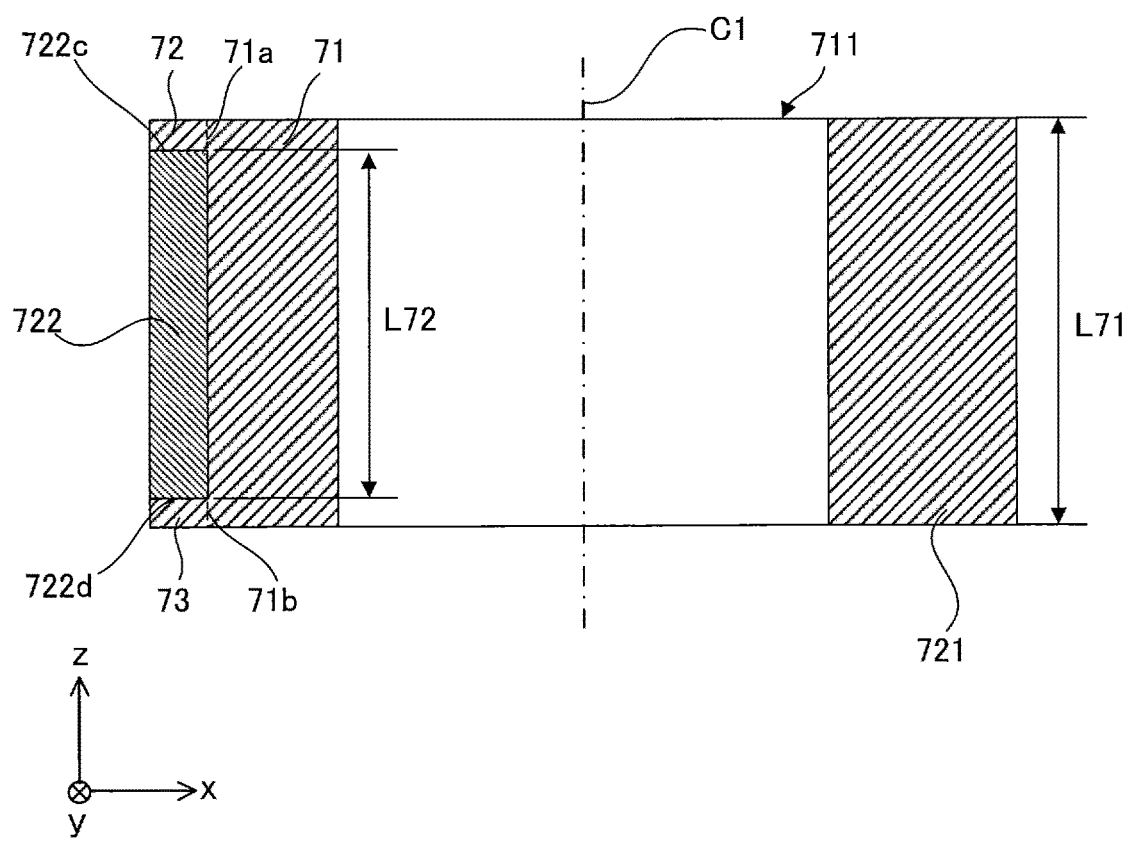
FIG. 30 is a sectional view showing the configuration of the rotor body according to the seventh embodiment.

FIG. 29 is a side view showing the configuration of a rotor body 711 of a rotor according to a seventh embodiment. FIG. 30 is a sectional view showing the configuration of the rotor body 711 according to the seventh embodiment. The rotor body 711 according to the seventh embodiment differs from the rotor body according to any one of the first to sixth embodiments in that an overhang part is provided on a ferrite bond magnet 721.

As shown in FIG. 29, the rotor body 711 includes a ferrite bond magnet 721 as a first permanent magnet and a plurality of rare-earth bond magnets 722 as second permanent magnets. The plurality of rare-earth bond magnets 722 are arranged at intervals in the circumferential direction R1.

The ferrite bond magnet 721 includes a cylinder part 71, a first overhang part 72 and a second overhang part 73. The cylinder part 71 is supported by the shaft 10 (see FIG. 1) via the connection part 12 (see FIG. 2). The length L71 of the cylinder part 71 in the axial direction is greater than the length L72 of the rare-earth bond magnet 722 in the axial direction.

The first overhang part 72 extends outward in the radial direction from an end part 71a of the cylinder part 71 on the +z-axis side. The first overhang part 72 is in contact with an end part 722c of the rare-earth bond magnet 722 on the +z-axis side. The second overhang part 73 extends outward in the radial direction from an end part 71b of the cylinder part 71 on the −z-axis side. The second overhang part 73 is in contact with an end part 722d of the rare-earth bond magnet 722 on the −z-axis side. An end part of the first overhang part 72 on the outer side in the radial direction and an end part of the second overhang part 73 on the outer side in the radial direction are flush with an outer peripheral surface of the rare-earth bond magnet 722. With this configuration, the first overhang part 72 and the second overhang part 73 get closer to the stator in the radial direction, and thus the magnetic flux flowing into the stator can be increased.

In the seventh embodiment, the cylinder part 71 and the rare-earth bond magnets 722 are joined to each other by the integral molding of the ferrite bond magnet 721 and the rare-earth bond magnets 722. Incidentally, in the seventh embodiment, the integral molding of the ferrite bond magnet 721 and the rare-earth bond magnets 722 means integrating the ferrite bond magnet 721 and the rare-earth bond magnets 722 together by molding the ferrite bond magnet 721 in a state where the rare-earth bond magnets 722 manufactured previously is arranged in a mold.

Further, in the seventh embodiment, the first overhang part 72 and the end part 722c of the rare-earth bond magnet 722 on the +z-axis side are joined to each other and the second overhang part 73 and the end part 722d of the rare-earth bond magnet 722 on the −z-axis side are joined to each other. As above, in the seventh embodiment, the ferrite bond magnet 721 and the rare-earth bond magnet 722 are joined to each other in the axial direction, and thus the joining area between the ferrite bond magnet 721 and the rare-earth bond magnet 722 can be increased. Accordingly, the falling off of the rare-earth bond magnet 722 from the ferrite bond magnet 721 can be prevented.

Figure 31:
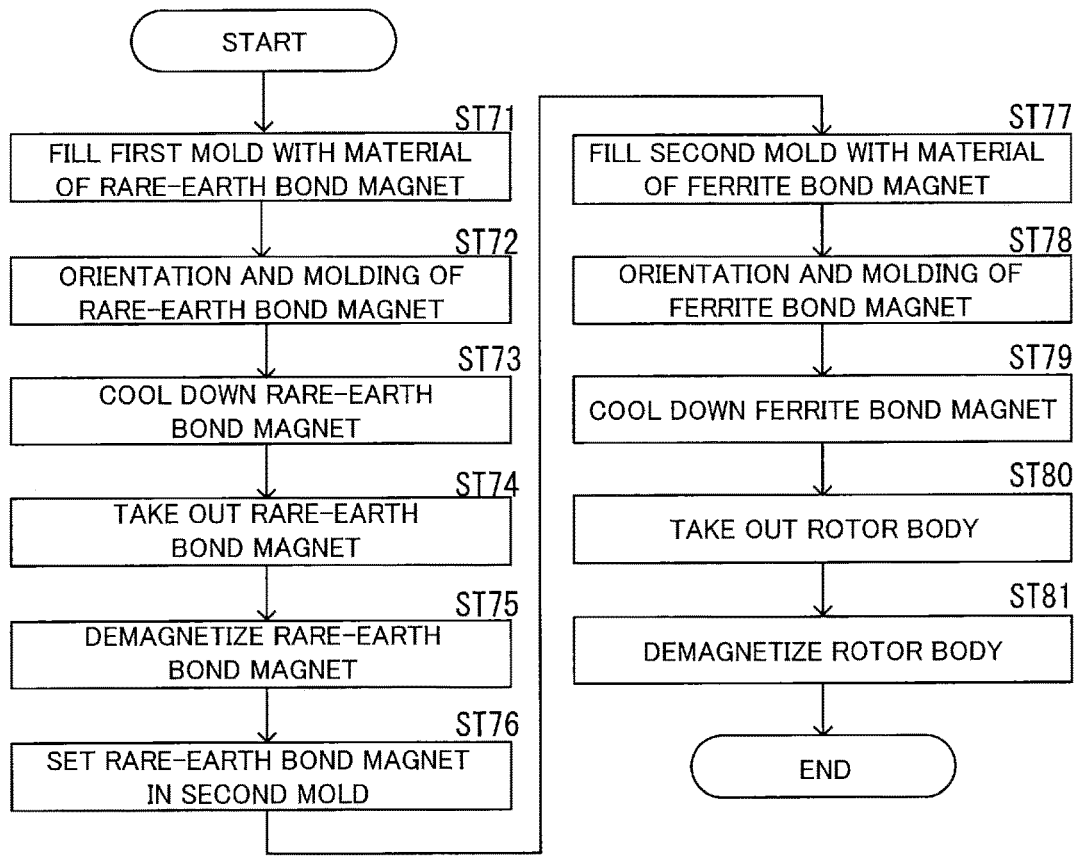
FIG. 31 is a flowchart showing details of a process for forming the rotor body according to the seventh embodiment.

Next, a process for forming the rotor body 711 will be described below by using FIG. 31. FIG. 31 is a flowchart showing the process for forming the rotor body 711.

In step ST71, the inside of a first mold for the injection molding of the rare-earth bond magnet 722 is filled in with the material of the rare-earth bond magnet 722.

In step ST72, the rare-earth bond magnet 722 having a predetermined shape is molded while the material of the rare-earth bond magnet 722 is oriented. In the step ST72, the rare-earth bond magnet 722 is molded while the material of the rare-earth bond magnet 722 is oriented in a state where a magnetic field having polar anisotropy is generated inside the first mold by using the magnet for the orientation, for example. By this step, the rare-earth bond magnet 722 having polar anisotropy orientation is molded.

In step ST73, the molded rare-earth bond magnet 722 is cooled down.

In step ST74, the rare-earth bond magnet 722 is taken out of the first mold.

In step ST75, the rare-earth bond magnet 722 taken out is demagnetized.

In step ST76, the rare-earth bond magnets 722 are arranged in a second mold.

In step ST77, the inside of the second mold is filled in with the material of the ferrite bond magnet 721.

In step ST78, the ferrite bond magnet 721 having a predetermined shape is molded while the material of the ferrite bond magnet 721 is oriented. In the step ST78, the ferrite bond magnet 721 is molded while the material of the ferrite bond magnet 721 is oriented in a state where a magnetic field having polar anisotropy is generated inside the second mold by using the magnet for the orientation, for example.

Steps ST79 to ST81 are the same as the steps ST19 to ST21 shown in FIG. 8.

With the rotor according to the seventh embodiment described above, the first overhang part 72 of the ferrite bond magnet 721 is joined to the end part 722c of the rare-earth bond magnet 722 on the +z-axis side. With this configuration, the joining area between the rare-earth bond magnet 722 and the ferrite bond magnet 721 increases, and thus the falling off of the rare-earth bond magnet 722 from the ferrite bond magnet 721 can be prevented.

Further, with the rotor according to the seventh embodiment, the second overhang part 73 of the ferrite bond magnet 721 is joined to the end part 722d of the rare-earth bond magnet 722 on the −z-axis side. With this configuration, the joining area between the rare-earth bond magnet 722 and the ferrite bond magnet 721 increases further, and thus the falling off of the rare-earth bond magnet 722 from the ferrite bond magnet 721 is further less likely to occur.

Furthermore, with the rotor according to the seventh embodiment, the ferrite bond magnet 721 is provided with the overhang parts (i.e., the first overhang parts 72 and the second overhang parts 73) for preventing the falling off of the rare-earth bond magnets 722. With this configuration, the length in the axial direction of the rare-earth bond magnet 722 is reduced as compared to the length in the axial direction of the rare-earth bond magnet 21 according to the first embodiment, and thus the amount of the rare-earth bond magnet 722 can be reduced. Accordingly, the manufacturing cost of the rotor can be reduced.

First Modification of Seventh Embodiment

Figure 32:
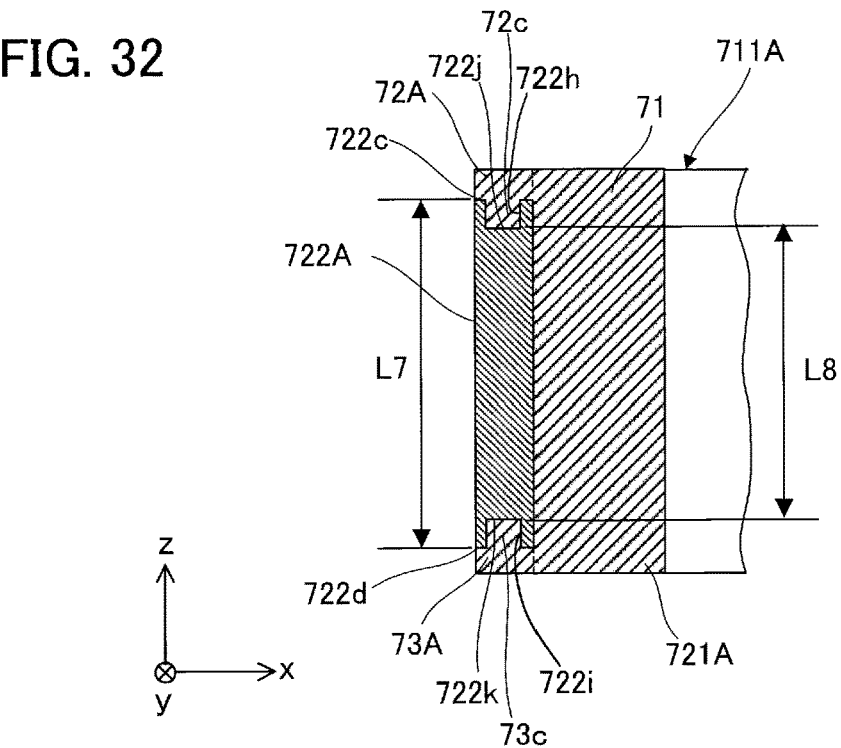
FIG. 32 is a partial sectional view showing the configuration of a rotor body according to a first modification of the seventh embodiment.

FIG. 32 is a partial sectional view showing the configuration of a rotor body 711A of a rotor according to a first modification of the seventh embodiment. In FIG. 32, components identical or corresponding to components shown in FIG. 30 are assigned the same reference characters as in FIG. 30. The rotor body 711A according to the first modification of the seventh embodiment differs from the rotor body 711 according to the seventh embodiment in that an overhang part is fitted with a concave part formed on the rare-earth bond magnet.

As shown in FIG. 32, the rotor body 711A of the rotor includes a ferrite bond magnet 721A and a rare-earth bond magnet 722A. The rare-earth bond magnet 722A includes a first concave part 722h formed on the end part 722c on the +z-axis side and a second concave part 722i formed on the end part 722d on the −z-axis side. Incidentally, the rare-earth bond magnet 722A may also be configured to include only one of the first concave part 722h and the second concave part 722i. Further, the rare-earth bond magnet 722A may also be configured to include a plurality of first concave parts 722h or a plurality of second concave parts 722i.

The ferrite bond magnet 721A includes the cylinder part 71, a first overhang part 72A and a second overhang part 73A. The first overhang part 72A includes a convex part 72c as a first fitting part. The convex part 72c projects toward the rare-earth bond magnet 722A from an end face of the first overhang part 72A on the −z-axis side. The convex part 72c is fitted in the first concave part 722h.

The second overhang part 73A includes a convex part 73c as a second fitting part. The convex part 73c projects toward the rare-earth bond magnet 722A from an end face of the second overhang part 73A on the +z-axis side. The convex part 73c is fitted in the second concave part 722i.

In the rare-earth bond magnet 722A, the length L7 in the axial direction between the end part 722c on the +z-axis side and the end part 722d on the −z-axis side is greater than the length L8 in the axial direction between a bottom surface 722j of the first concave part 722h and a bottom surface 722k of the second concave part 722i.

With the rotor according to the first modification of the seventh embodiment described above, the convex part 72c of the first overhang part 72A is fitted in the first concave part 722h formed on the rare-earth bond magnet 722A. With this configuration, the falling off of the rare-earth bond magnet 722A from the ferrite bond magnet 721A is further less likely to occur.

Further, with the rotor according to the first modification of the seventh embodiment, the convex part 73c of the second overhang part 73A is fitted in the second concave part 722i famed on the end part 722d on the −z-axis side. With this configuration, the falling off of the rare-earth bond magnet 722A from the ferrite bond magnet 721A is further less likely to occur.

Second Modification of Seventh Embodiment

Figure 33:
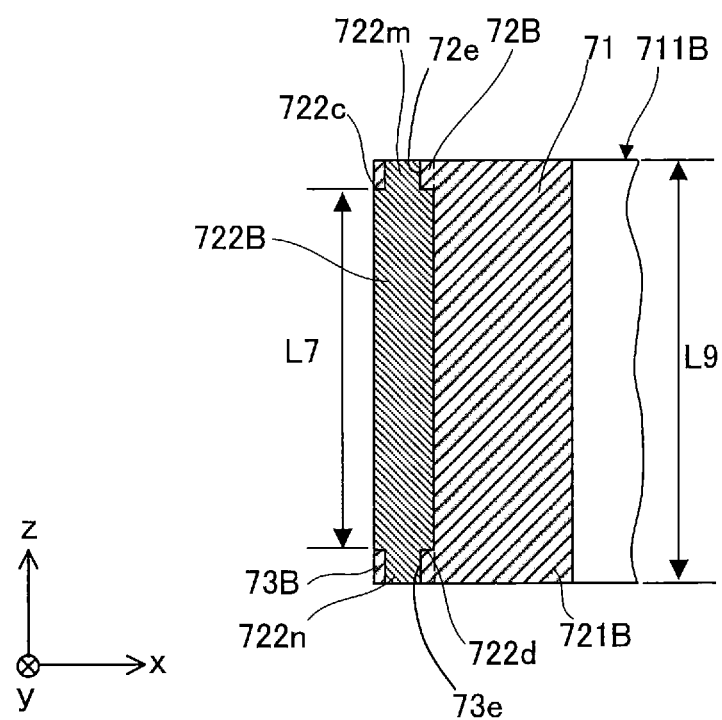
FIG. 33 is a partial sectional view showing the configuration of a rotor body according to a second modification of the seventh embodiment.

FIG. 33 is a partial sectional view showing the configuration of a rotor body 711B of a rotor according to a second modification of the seventh embodiment. In FIG. 33, components identical or corresponding to components shown in FIG. 30 are assigned the same reference characters as in FIG. 30. The rotor body 711B according to the second modification of the seventh embodiment differs from the rotor body 711 according to the seventh embodiment in that an overhang part is fitted with a convex part formed on the rare-earth bond magnet.

As shown in FIG. 33, the rotor body 711B includes a ferrite bond magnet 721B and a rare-earth bond magnet 722B. The rare-earth bond magnet 722B includes a first convex part 722m projecting toward the +z-axis side from the end part 722c on the +z-axis side and a second convex part 722n projecting toward the −z-axis side from the end part 722d on the −z-axis side. Incidentally, the rare-earth bond magnet 722B may also be configured to include only one of the first convex part 722m and the second convex part 722n. Further, the rare-earth bond magnet 722B may also be configured to include a plurality of first convex parts 722m or a plurality of second convex parts 722n.

The ferrite bond magnet 721B includes the cylinder part 71, a first overhang part 72B and a second overhang part 73B. The first overhang part 72B includes a through hole 72e as a first fitting part. The through hole 72e is fitted on the first convex part 722m. Incidentally, the first overhang part 72B may also be configured to include a concave part to be fitted on the first convex part 722m instead of the through hole 72e.

The second overhang part 73B includes a through hole 73e as a second fitting part. The through hole 73e is fitted on the second convex part 722n. Incidentally, the second overhang part 73B may also be configured to include a concave part to be fitted on the second convex part 722n instead of the through hole 73e.

In the rare-earth bond magnet 722B, the length L7 in the axial direction between the end part 722c on the +z-axis side and the end part 722d on the −z-axis side is less than the length L9 in the axial direction between the tip end surface 222j of the first convex part 222m and the tip end surface 222k of the second convex part 222n.

With the rotor according to the second modification of the seventh embodiment described above, the through hole 72e of the first overhang part 72B is fitted on the first convex part 722m of the rare-earth bond magnet 722B. With this configuration, the falling off of the rare-earth bond magnet 722B from the ferrite bond magnet 721B is further less likely to occur.

Further, with the rotor according to the second modification of the seventh embodiment, the through hole 73e of the second overhang part 73B is fitted on the second convex part 722n of the rare-earth bond magnet 722B. With this configuration, the falling off of the rare-earth bond magnet 722B from the ferrite bond magnet 721B is further less likely to occur.

Third Modification of Seventh Embodiment

Figure 34A:
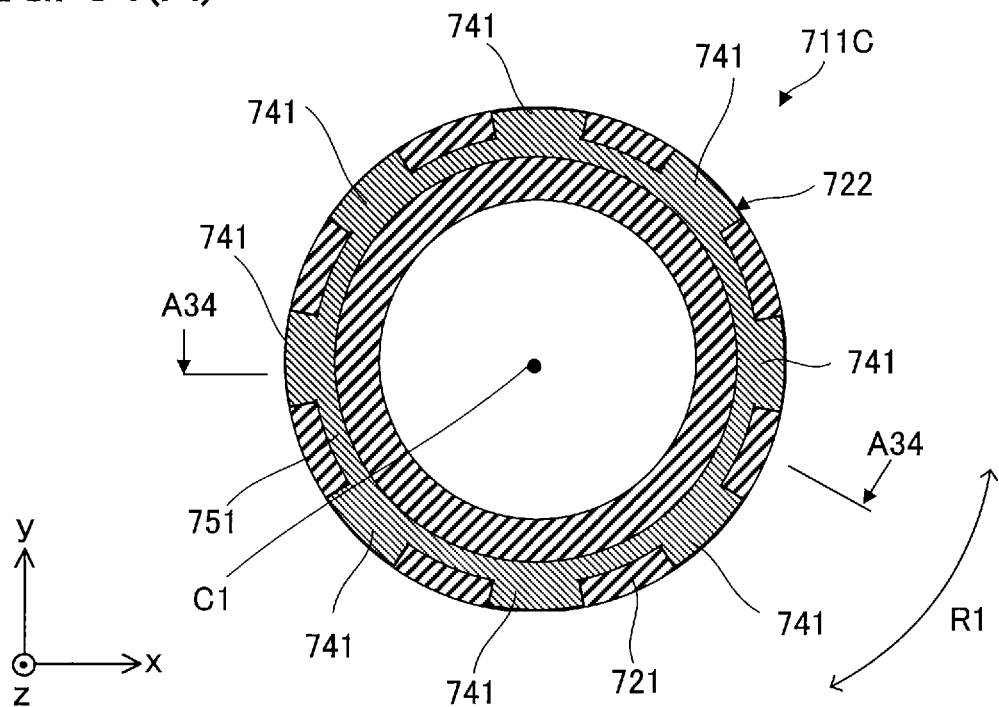
FIG. 34(A) is a sectional view showing the configuration of a rotor body according to a third modification of the seventh embodiment.
Figure 34B:
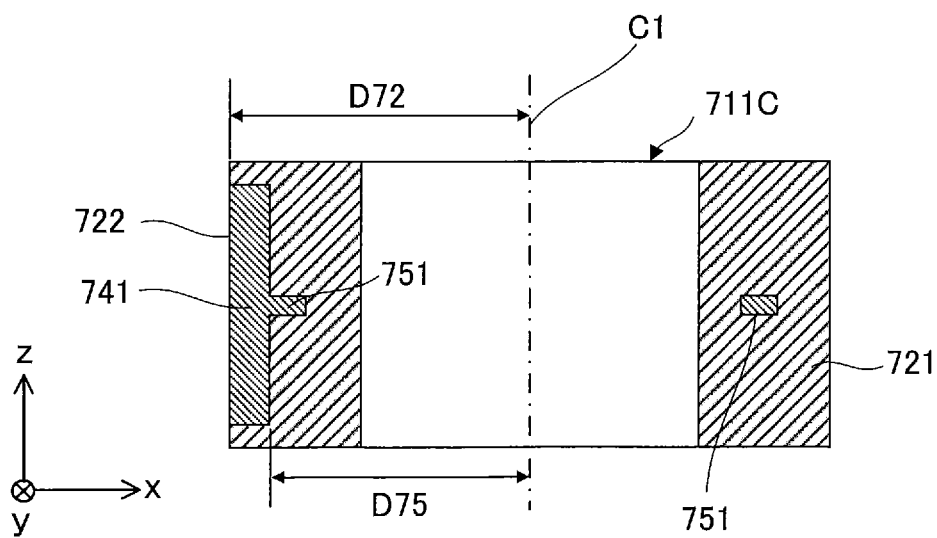
FIG. 34(B) is another sectional view showing the configuration of the rotor body according to the third modification of the seventh embodiment.

FIG. 34(A) is a sectional view showing the configuration of a rotor body 711C of a rotor according to a third modification of the seventh embodiment. FIG. 34(B) is another sectional view showing the configuration of the rotor body 711C of the rotor according to the third modification of the seventh embodiment. The rotor body 711C according to the third modification of the seventh embodiment differs from the rotor body 711 according to the seventh embodiment in that a plurality of rare-earth bond magnets are connected together.

As shown in FIGS. 34(A) and 34(B), the rotor body 711C includes a ferrite bond magnet 721 and a rare-earth bond magnet 722. The rare-earth bond magnet 722 includes a plurality of pillar parts 741 arranged at intervals in the circumferential direction R1 and a connection part 751 connecting the plurality of pillar parts 741 together. The outer diameter D72 of the ferrite bond magnet 721 is greater than the outer diameter D75 of the connection part 751. The connection part 751 is arranged between the end part 722c of the rare-earth bond magnet 722 on the +z-axis side and the end part 722d of the rare-earth bond magnet 722 on the −z-axis side. In the third modification of the seventh embodiment, the connection part 751 is arranged at a central part of the rare-earth bond magnet 722 in the axial direction.

With the rotor according to the third modification of the seventh embodiment described above, the rare-earth bond magnet 722 of the rotor body 711 includes the connection part 751 connecting the plurality of pillar parts 741 together. With this configuration, the falling off of the rare-earth bond magnet 722 from the ferrite bond magnet 721 during the rotation is further less likely to occur.

Eighth Embodiment

Figure 35:
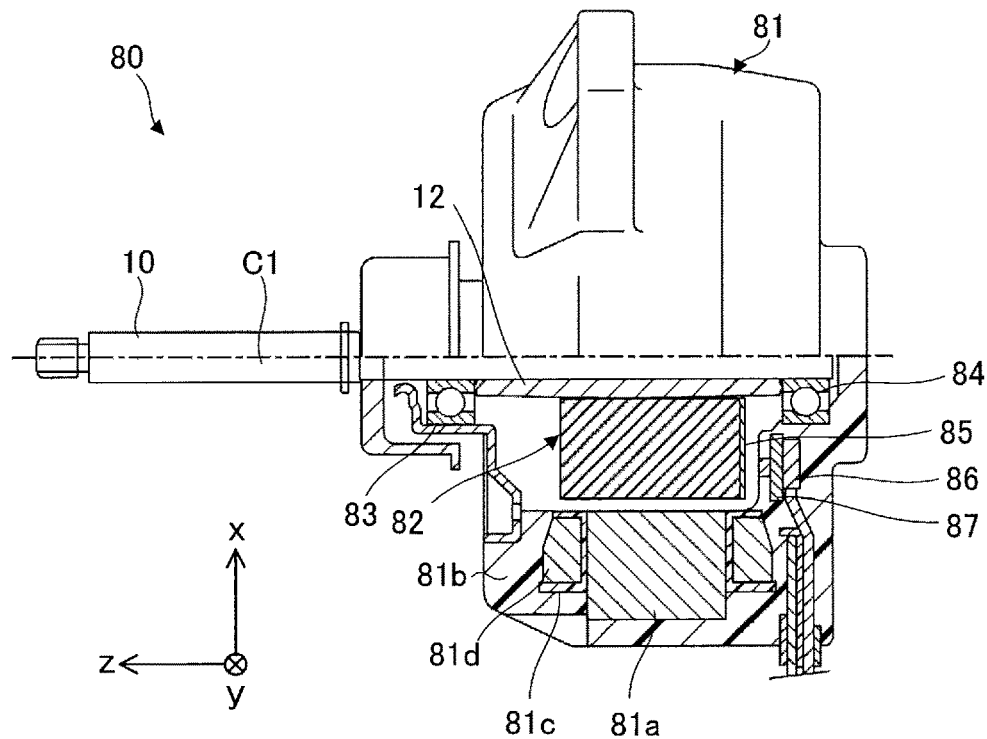
FIG. 35 is a configuration diagram showing a partial cross section and a side face of a motor according to an eighth embodiment.

Next, a motor 80 including the rotor according to any one of the above-described first to seventh embodiments will be described below. FIG. 35 is a configuration diagram showing a partial cross section and a side face of the motor 80 according to an eighth embodiment. As shown in FIG. 35, the motor 80 includes a stator 81 and a rotor 82. The motor 80 is a permanent magnet synchronous motor, for example.

The stator 81 includes a stator core 81a and a mold resin part 81b that covers the stator core 81a. A coil 81d is wound around the stator core 81a via an insulator 81c. The mold resin part 81b is famed of a thermosetting resin such as BMC (Bulk Molding Compound) resin, for example.

The rotor 82 is arranged on the inner side of the stator 81 in the radial direction. Namely, the motor 80 is a motor of the inner rotor type. The rotor according to any one of the first to seventh embodiments can be employed as the rotor 82. The shaft 10 of the rotor 82 is rotatably supported by bearings 83 and 84.

The rotor 82 is provided with a sensor magnet 85. The sensor magnet 85 faces a circuit board 86. A magnetic field of the sensor magnet 85 is detected by a magnetic sensor 87 provided on the circuit board 86, by which a rotational position of the rotor is detected.

In the rotor according to any one of the first to seventh embodiments, the falling off of the rare-earth bond magnet arranged on the outer side is prevented, and thus the quality of the rotor can be improved. Accordingly, the quality of the motor including the rotor can also be improved.

Ninth Embodiment

Figure 36:
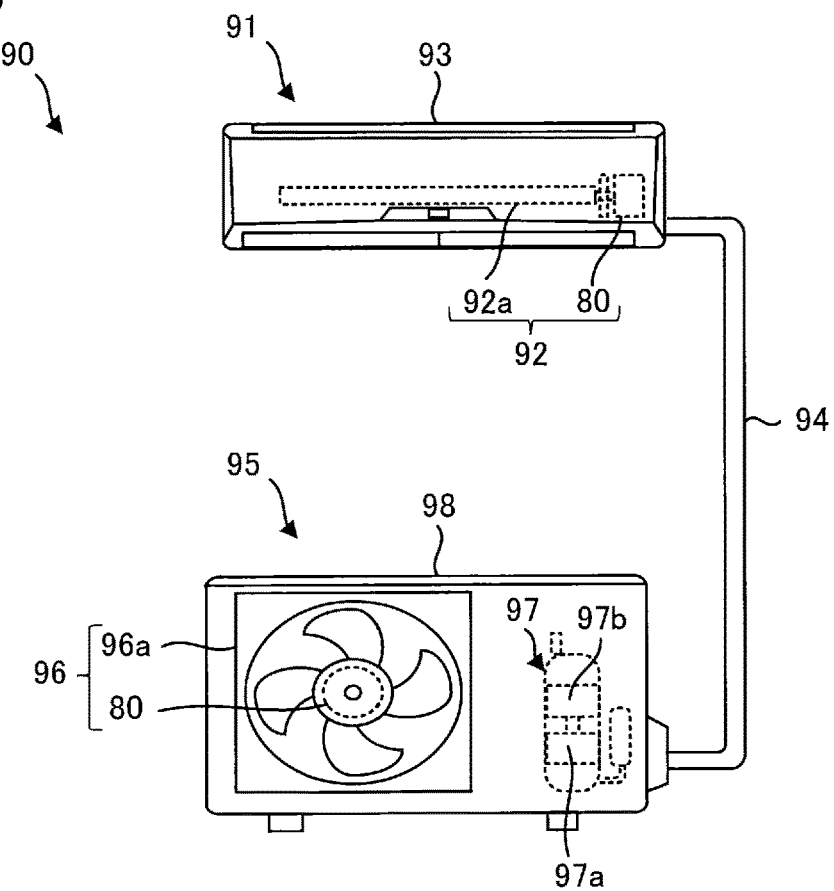
FIG. 36 is a diagram schematically showing the configuration of an air conditioner according to a ninth embodiment.

FIG. 36 is a diagram schematically showing the configuration of an air conditioner 90 according to a ninth embodiment. As shown in FIG. 36, the air conditioner 90 includes an indoor unit 91 and an outdoor unit 95 connected to the indoor unit 91 via a refrigerant pipe 94. The air conditioner 90 is capable of executing an operation such as a cooling operation in which the indoor unit 91 blows out cool air or a heating operation in which the indoor unit 91 blows out warm air, for example.

The indoor unit 91 includes an indoor blower 92 as a blower and a housing 93 that covers the indoor blower 92. The indoor blower 92 includes the motor 80 and an impeller 92a fixed to the shaft of the motor 80. The impeller 92a is driven by the motor 80, by which an airflow is generated. The impeller 92a is a cross-flow fan, for example.

The outdoor unit 95 includes an outdoor blower 96 as a blower, a compressor 97, and a housing 98 that covers the outdoor blower 96 and the compressor 97. The outdoor blower 96 includes the motor 80 and an impeller 96a fixed to the shaft of the motor 80. The impeller 96a is driven by the motor 80, by which an airflow is generated. The impeller 96a is a propeller fan, for example. The compressor 97 includes a motor 97a and a compression mechanism 97b driven by the motor 97a.

As described above, in the air conditioner 90 according to the ninth embodiment, the motor 80 according to the eighth embodiment is applied to the indoor blower 92 and the outdoor blower 96, for example. In the motor 80 according to the eighth embodiment, the falling off of the rare-earth bond magnet in the rotor is prevented as described earlier, and thus the quality of the motor 80 is improved. Accordingly, the quality of the indoor blower 92 and the outdoor blower 96 is also improved. Further, the quality of the air conditioner 90 including the indoor blower 92 and the outdoor blower 96 is also improved. Incidentally, the motor 80 may also be provided in only one of the indoor blower 92 and the outdoor blower 96. Further, the motor 80 may also be applied to the motor 97a of the compressor 97. Furthermore, the motor 80 according to the eighth embodiment may also be installed in equipment other than the air conditioner 90.

What is claimed is:

1. A rotor comprising:
a rotary shaft; and
a rotor body supported by the rotary shaft,
wherein the rotor body comprises a first permanent magnet and a second permanent magnet,
wherein the second permanent magnet is supported by the rotary shaft,
wherein the first permanent magnet has a plurality of pillar parts arranged at intervals in a circumferential direction of the rotor body and a first overhang part that is in contact with a first end part of the second permanent magnet in an axial direction of the rotary shaft,
wherein the first permanent magnet is supported by the second permanent magnet on an outer side of the second permanent magnet, and
wherein the first overhang part and the first end part are joined to each other.

2. The rotor according to claim 1, wherein the first permanent magnet further has a second overhang part that is in contact with a second end part on a side in the axial direction opposite to the first end part, and
wherein the second overhang part and the second end part are joined to each other.

3. The rotor according to claim 1, wherein the second permanent magnet has a first concave part or a first convex part formed on the first end part in the axial direction, and
wherein the first overhang part has a first fitting part that is fitted with the first concave part or the first convex part.

4. The rotor according to claim 3, wherein the second permanent magnet has a second concave part or a second convex part formed on a second end part on a side in the axial direction opposite to the first end part,
wherein the first permanent magnet further has a second overhang part that is in contact with the second end part on the side opposite to the first end part, and
wherein the second overhang part has a second fitting part that is fitted with the second concave part or the second convex part.

5. The rotor according to claim 1, wherein the second permanent magnet has a first step part that is recessed from the first end part toward one side in the axial direction, and
wherein the first overhang part and a bottom surface of the first step part are joined to each other.

6. The rotor according to claim 5, wherein the second permanent magnet further has a second step part recessed from a second end part on a side in the axial direction opposite to the first end part toward another side in the axial direction,
wherein the first permanent magnet further has a second overhang part that is in contact with the second end part on the side in the axial direction opposite to the first end part, and
wherein the second overhang part and a bottom surface of the second step part are joined to each other.

7. The rotor according to claim 1, wherein the pillar parts are situated on the outer side in a radial direction of the rotor relative to the first overhang part and supported by the second permanent magnet, and
wherein a length of the first overhang part in a circumferential direction of the rotor is greater than a length of the pillar part in the circumferential direction.

8. The rotor according to claim 7, wherein the first permanent magnet further has a second overhang part that is in contact with a second end part on a side in the axial direction opposite to the first end part,
wherein the second overhang part and the second end part are joined to each other, and
wherein a length of the second overhang part in the circumferential direction is equal to a length of the first overhang part in the circumferential direction.

9. The rotor according to claim 7, wherein the first permanent magnet further has a second overhang part that is in contact with a second end part on a side in the axial direction opposite to the first end part,
wherein the second overhang part and the second end part are joined to each other, and
wherein a length of the second overhang part in the circumferential direction differs from a length of the first overhang part in the circumferential direction.

10. The rotor according to claim 7, wherein the first overhang part has a first part that extends from the pillar part toward one side in the circumferential direction of the rotor and a second part that extends from the pillar part toward another side in the circumferential direction, and
wherein the second permanent magnet is arranged between the first part and the second part in the circumferential direction.

11. The rotor according to claim 1, wherein the first permanent magnet has a plurality of first overhang parts arranged at intervals in a circumferential direction of the rotor and having the first overhang part and a connection part that connects the plurality of first overhang parts adjoining in the circumferential direction.

12. The rotor according to claim 11, wherein the second permanent magnet has a groove part that is formed on the first end part, and the connection part is arranged in the groove part.

13. The rotor according to claim 1, further comprising a first resin part that is fixed to the first overhang part and the second permanent magnet in the axial direction.

14. The rotor according to claim 13, further comprising a second resin part that connects the rotary shaft and the rotor body to each other, and
wherein the first resin part is connected to the second resin part.

15. The rotor according to claim 1, wherein the first permanent magnet is a rare-earth bond magnet, and
wherein the second permanent magnet is a ferrite bond magnet.

16. A rotor comprising:
a rotary shaft; and
a rotor body supported by the rotary shaft,
wherein the rotor body comprises a first permanent magnet and a second permanent magnet,
wherein the first permanent magnet has a first overhang part that is in contact with a first end part of the second permanent magnet in an axial direction of the rotary shaft, and is supported by the rotary shaft,
wherein the second permanent magnet has a plurality of pillar parts arranged at intervals in a circumferential direction of the rotor and supported by the first permanent magnet on an outer side of the first permanent magnet,
wherein the first overhang part and the first end part are joined to each other.

17. The rotor according to claim 16, wherein the second permanent magnet has a connection part that connects the plurality of pillar parts adjoining in the circumferential direction.

18. The rotor according to claim 17, wherein the connection part is arranged between the first end part of the second permanent magnet in the axial direction and a second end part on a side opposite to the first end part.

19. The rotor according to claim 16, wherein the first permanent magnet is a ferrite bond magnet, and
wherein the second permanent magnet is a rare-earth bond magnet.

20. The rotor according to claim 1, wherein the rotor has 2n magnetic poles (n: natural number greater than or equal to 1), and
wherein the first permanent magnet and the second permanent magnet forming an outer peripheral surface of the rotor body have polar anisotropy and differ from each other in magnetic pole strength.

21. A motor comprising:
the rotor according to claim 1; and
a stator.

22. A blower comprising:
the motor according to claim 21; and
an impeller that is driven by the motor.

23. An air conditioner comprising:
an indoor unit; and
an outdoor unit connected to the indoor unit,
wherein at least one of the indoor unit and the outdoor unit comprises the motor according to claim 21.

24. A manufacturing method of a rotor, comprising:
a step of forming a rotor body having a first permanent magnet and a second permanent magnet; and
a step of connecting the rotor body to a rotary shaft,
wherein in the step of forming the rotor body, the first permanent magnet and the second permanent magnet are formed by integral molding so that:
the second permanent magnet is supported by the rotary shaft,
the first permanent magnet is supported by the second permanent magnet on an outer side of the second permanent magnet, and has a plurality of pillar parts arranged at intervals in a circumferential direction of the rotor body and a first overhang part that is in contact with a first end part of the second permanent magnet in an axial direction of the rotary shaft, and
the first overhang part and the first end part are joined to each other.

25. A manufacturing method of a rotor, comprising:
a step of forming a rotor body having a first permanent magnet and a second permanent magnet; and
a step of connecting the rotor body to a rotary shaft,
wherein in the step of forming the rotor body, the first permanent magnet and the second permanent magnet are formed by integral molding so that:
the first permanent magnet is supported by the rotary shaft, and has a first overhang part that is in contact with a first end part of the second permanent magnet in an axial direction of the rotary shaft,
the second permanent magnet is supported by the first permanent magnet on an outer side of the first permanent magnet, and has a plurality of pillar parts arranged at intervals in a circumferential direction of the rotor body, and
the first overhang part and the first end part are joined to each other.

* * * * *